United States Patent
Tokuhara et al.

(10) Patent No.: US 11,618,527 B2
(45) Date of Patent: Apr. 4, 2023

(54) CONTROL DEVICE, AND SUSPENSION SYSTEM

(71) Applicant: Hitachi Astemo, Ltd., Hitachinaka (JP)

(72) Inventors: Masato Tokuhara, Hitachinaka (JP); Kimitoshi Sato, Hitachinaka (JP); Yosuke Murakami, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 135 days.

(21) Appl. No.: 17/357,426

(22) Filed: Jun. 24, 2021

(65) Prior Publication Data

US 2021/0316814 A1 Oct. 14, 2021

Related U.S. Application Data

(63) Continuation of application No. PCT/JP2019/004086, filed on Feb. 5, 2019.

(51) Int. Cl.
*B60G 17/016* (2006.01)
*B62K 25/08* (2006.01)
*B62K 25/10* (2006.01)
*B62K 25/04* (2006.01)

(52) U.S. Cl.
CPC .......... *B62K 25/08* (2013.01); *B60G 17/0164* (2013.01); *B62K 25/10* (2013.01); *B60G 2300/12* (2013.01); *B60G 2400/106* (2013.01); *B60G 2500/10* (2013.01); *B62K 2025/044* (2013.01)

(58) Field of Classification Search
CPC .. B62K 25/08; B62K 25/10; B62K 2025/044; B60G 17/0164; B60G 2300/12; B60G 2400/106; B60G 2500/10
See application file for complete search history.

(56) References Cited

U.S. PATENT DOCUMENTS

| | | | | |
|---|---|---|---|---|
| 10,138,819 | B2* | 11/2018 | Matsuda | F02D 9/08 |
| 11,524,684 | B2* | 12/2022 | Sugai | B60W 10/22 |
| 2013/0030649 | A1* | 1/2013 | Matsuda | B60T 8/3225 |
| | | | | 701/38 |
| 2015/0066295 | A1 | 3/2015 | Kanda | |
| 2020/0276961 | A1* | 9/2020 | Kaneta | B60T 8/3225 |
| 2020/0369277 | A1* | 11/2020 | Sugai | B60G 17/06 |

(Continued)

FOREIGN PATENT DOCUMENTS

| | | |
|---|---|---|
| DE | 102011002537 A1 | 7/2012 |
| DE | 102013212861 A1 | 1/2015 |

(Continued)

OTHER PUBLICATIONS

German Office Action dated Mar. 18, 2022 for the corresponding German Patent Application No. 112019005937.8, 8 pages including English translation.

(Continued)

*Primary Examiner* — Toan C To
(74) *Attorney, Agent, or Firm* — Leason Ellis LLP; Edward J. Ellis; Melvin C. Garner

(57) ABSTRACT

A control device is configured to control a damping force of a damping device using a difference between a front-rear acceleration of a vehicle main body and a rotational acceleration of a vehicle wheel, the damping device being configured to dampen a force generated between the vehicle main body and the vehicle wheel.

10 Claims, 18 Drawing Sheets

(56) References Cited

U.S. PATENT DOCUMENTS

| 2022/0153377 | A1* | 5/2022 | Nose | B62J 45/42 |
| 2022/0161766 | A1* | 5/2022 | Nose | B62L 3/00 |
| 2022/0161788 | A1* | 5/2022 | Tamashima | B60W 30/12 |
| 2022/0169239 | A1* | 6/2022 | Nose | B62J 27/00 |
| 2022/0250595 | A1* | 8/2022 | Eisele | B60T 8/172 |

FOREIGN PATENT DOCUMENTS

| DE | 112019007124 T5 * | 12/2021 | |
| JP | 63-34213 A | 2/1988 | |
| JP | 3-32941 A | 2/1991 | |
| JP | 7-81352 A | 3/1995 | |
| JP | 2000-095079 A | 4/2000 | |
| JP | 2006-131137 A | 5/2006 | |
| JP | 2008-167624 A | 7/2008 | |
| JP | 2015-47906 A | 3/2015 | |
| JP | 6636210 B1 * | 1/2020 | |
| JP | 6669935 B1 * | 3/2020 | B60G 17/0164 |
| WO | WO-2020202266 A1 * | 10/2020 | B60W 10/20 |
| WO | WO-2020202283 A1 * | 10/2020 | B60W 10/04 |

OTHER PUBLICATIONS

International Search Report dated May 14, 2019 for the corresponding PCT International Patent Application No. PCT/JP2019/004086.
Written Opinion dated May 14, 2019 for the corresponding PCT International Patent Application No. PCT/JP2019/004086.

* cited by examiner

CONTROL DEVICE, AND SUSPENSION SYSTEM

CROSS-REFERENCE TO RELATED APPLICATION(S)

This application is a continuation of PCT application No. PCT/JP2019/004086, which was filed on Feb. 5, 2019, the contents of which are incorporated herein by reference.

FIELD OF THE INVENTION

The present invention relates to a control device and a suspension system.

BACKGROUND OF THE INVENTION

In the related art, there has been proposed a control device capable of optimizing a posture of a vehicle body even when a vehicle behavior becomes unstable.

For example, a suspension control device described in JP-A-2015-47906 includes a basic input amount calculation unit which calculates a basic input amount of a vehicle based on a vehicle wheel speed fluctuation amount detected by a vehicle wheel speed sensor, a first target current setting unit which sets a first target current based on the basic input amount, a second target current setting unit which sets a second target current based on a vehicle body acceleration detected by an acceleration sensor, and a damper control unit which controls a damper based on the first target current when a vehicle behavior control device for controlling a behavior of the vehicle is not operating and based on the second target current when the vehicle behavior control device is operating.

In order to stabilize the behavior of the vehicle, it is desirable to reduce a vibration generated in a suspension device. In the technique disclosed in JP-A-2015-47906, there is room for further improvement in terms of stabilizing the behavior of the vehicle.

An object of the present invention is to provide a control device or the like which control a damping force of a damping device so as to stabilize a behavior of a vehicle.

SUMMARY OF INVENTION

The present inventors have analyzed a vehicle behavior after a brake operation, more specifically, a vehicle wheel speed of a front wheel, a vehicle wheel speed of a rear wheel, and a time change of a suspension behavior after the brake operation. The present inventors have analyzed a vehicle behavior after a throttle grip operation. As a result, it has been found that the behavior of the vehicle can be stabilized by controlling a damping force of a damping device using a difference between a front-rear acceleration of a vehicle main body and a rotational acceleration of the vehicle wheel. The present inventors have completed the present invention based on these findings.

Hereinafter, the present invention will be described. In the following description, for ease of understanding of the present invention, reference numerals in the accompanying drawings are appended in parentheses, but the present invention is not limited to the illustrated embodiments.

According to a first aspect, there is provided a control device (100, 400, 500, 600, 700, 800) configured to control a damping force of a damping device (21d, 22d) using a difference between a front-rear acceleration (Gx) of a vehicle main body (10) and a rotational acceleration (Af, Ar) of a vehicle wheel (2, 3), the damping device being configured to dampen a force generated between the vehicle main body (10) and the vehicle wheel (2, 3).

Here, the vehicle wheel may be a front wheel (2), and the control device is configured to control a damping force of either or both of a first damping device (21d) and a second damping device (22d), the first damping device being arranged on a front wheel (2) side, the second damping device being arranged on a rear wheel (3) side.

In the first aspect described above, when the rotational acceleration (Af) of the front wheel (2) is greater than the front-rear acceleration (Gx), the control device may be configured to control to increase either or both of a damping force of the first damping device (21d) in an extension direction, in which a relative displacement between the vehicle main body (10) and the front wheel (2) increases, and a damping force of the second damping device (22d) in a compression direction, in which a relative displacement between the vehicle main body (10) and a rear wheel (3) decreases.

In the first aspect described above, the front-rear acceleration (Gx) may be less than 0 (g).

In the first aspect described above, the control device may be configured to determine that an antilock brake system (80) is operating to control a slip state of the front wheel (2) by controlling a braking device (60) configured to adjust a braking torque generated on the front wheel (2), when the rotational acceleration (Af) of the front wheel (2) is greater than the front-rear acceleration (Gx).

Further, in the first aspect described above, when the control device may be configured to determine that the antilock brake system (80) is operating, the control device may be configured to control the damping force to be greater than a damping device generated when the control device determines that the antilock brake system (80) is not operating.

Further, in the first aspect described above, the vehicle wheel may be a rear wheel (3), and the control device may be configured to control a damping force of either or both of a first damping device (21d) and the second damping device (22d), the first damping device being arranged on the front wheel (2) side, the second damping device being arranged on the rear wheel (3) side.

In the first aspect described above, when the rotational acceleration (Ar) of the rear wheel (3) is less than the front-rear acceleration (Gx), the control device may be configured to control to increase either or both of a damping force of the first damping device (21d) in the compression direction, in which the relative displacement between the vehicle main body (10) and the front wheel (2) decreases, and a damping force of the second damping device (22d) in the extension direction, in which the relative displacement between the vehicle main body (10) and the rear wheel (3) increases.

In the first aspect described above, in which the vehicle wheel is the rear wheel (3), the front-rear acceleration may be greater than 0 (g).

In the first aspect described above, the control device may be configured to determine that a traction control system (90) configured to control to suppress an idle rotation of the rear wheel (3) is operating, when the rotational acceleration (Ar) of the rear wheel (3) is less than the front-rear acceleration (Gx).

Further, in the first aspect described above, when the control device may be configured to determine that the traction control system (90) is operating, the control device is configured to control the damping force to be greater than a damping force generated when the control device determines that the traction control system (90) is not operating.

In the first aspect described above, a control is performed using a difference between the rotational acceleration (Af, Ar) and the front-rear acceleration (Gx), the front-rear acceleration being a front-rear acceleration after a filtering processing corresponding to a high-pass filter is applied to the front-rear acceleration (Gx) detected by a sensor (50) configured to detect the front-rear acceleration (Gx) of the vehicle main body (10).

In the first aspect described above, a control is performed using a difference between the rotational acceleration (Af, Ar) and the front-rear acceleration (Gx), the front-rear acceleration being a front-rear acceleration after a filtering processing corresponding to a band-pass filter, or a filtering processing corresponding to a high-pass filter and a filtering processing corresponding to a low-pass filter are applied to the front-rear acceleration (Gx) detected by a sensor (50) configured to the front-rear acceleration (Gx) of the vehicle main body (10).

In the first aspect described above, a control is performed using a difference between the front-rear acceleration (Gx) and the rotational acceleration (Af, Ar), the rotational acceleration being a rotational acceleration after a filtering processing corresponding to a high-pass filter is applied to the rotational acceleration (Af, Ar) calculated using the rotational speed detected by a sensor (41, 42) configured to detect the rotational speed of the vehicle wheel (2, 3).

In the first aspect described above, a control is performed using a difference between the front-rear acceleration (Gx) and the rotational acceleration (Af, Ar), the rotational acceleration being a rotational acceleration after a filtering processing corresponding to a band-pass filter, or a filtering processing corresponding to a high-pass filter and a filtering process corresponding to a low-pass filter are applied to the rotational acceleration (Af, Ar) calculated using the rotational speed detected by a sensor (41, 42) configured to detect the rotational speed of the vehicle wheel (2, 3).

According to a second aspect, there is provided a suspension system (20) including: the control device (100, 400, 500, 600, 700, 800) described in the first aspect; and a suspension (21) whose damping force is controlled by the control device (100, 400, 500, 600, 700, 800).

According to the present invention, it is possible to provide the control device or the like which control the damping force of the damping device so as to stabilize the behavior of the vehicle.

DETAILED DESCRIPTION OF THE INVENTION

Hereinafter, embodiments of the present invention will be described in detail with reference to the accompanying drawings.

First Embodiment

Figure 1:
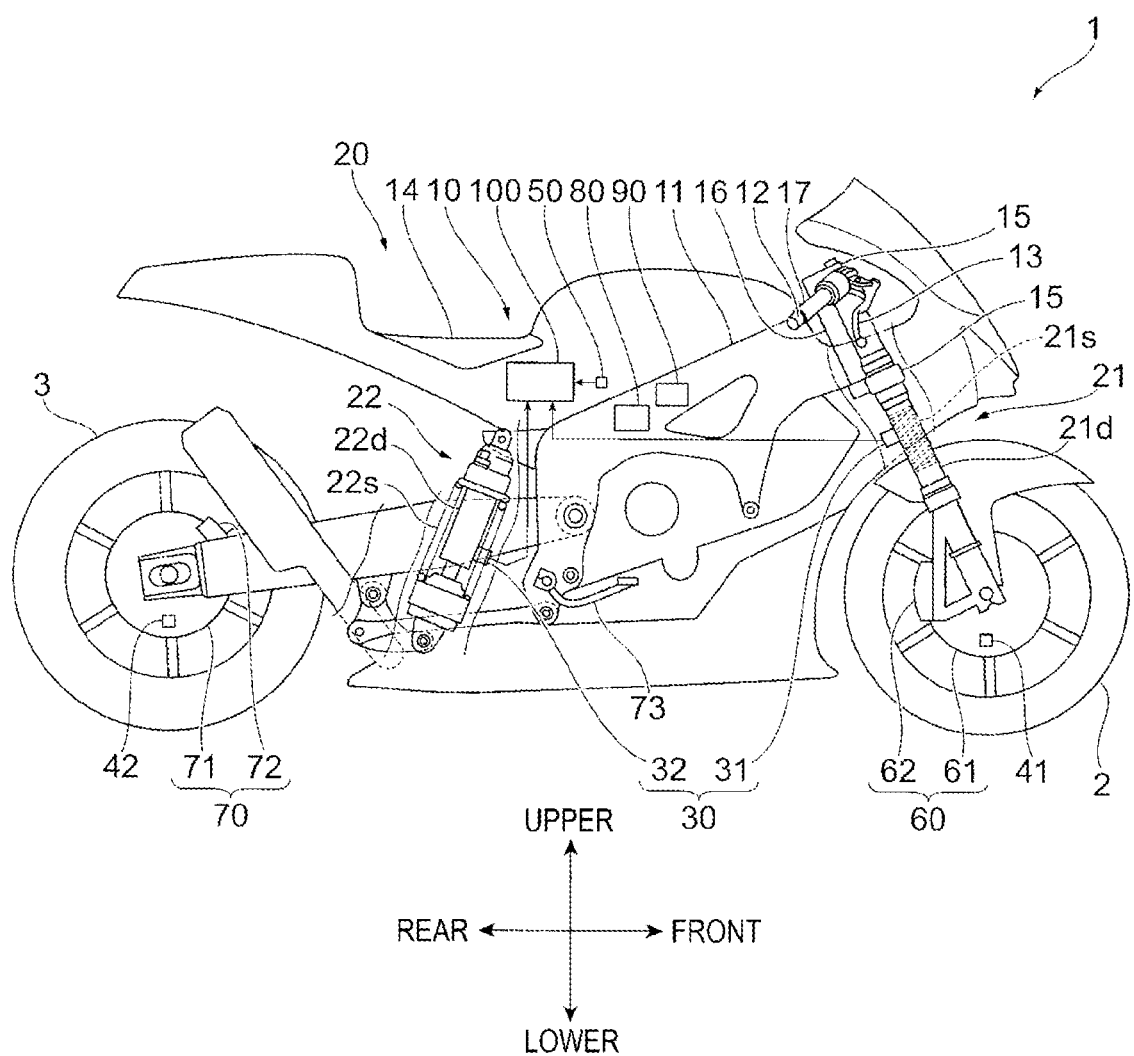
FIG. 1 is a diagram illustrating a schematic configuration of a motorcycle 1 according to a first embodiment.

FIG. 1 is a diagram illustrating a schematic configuration of a motorcycle 1 according to a first embodiment.

Figure 2:
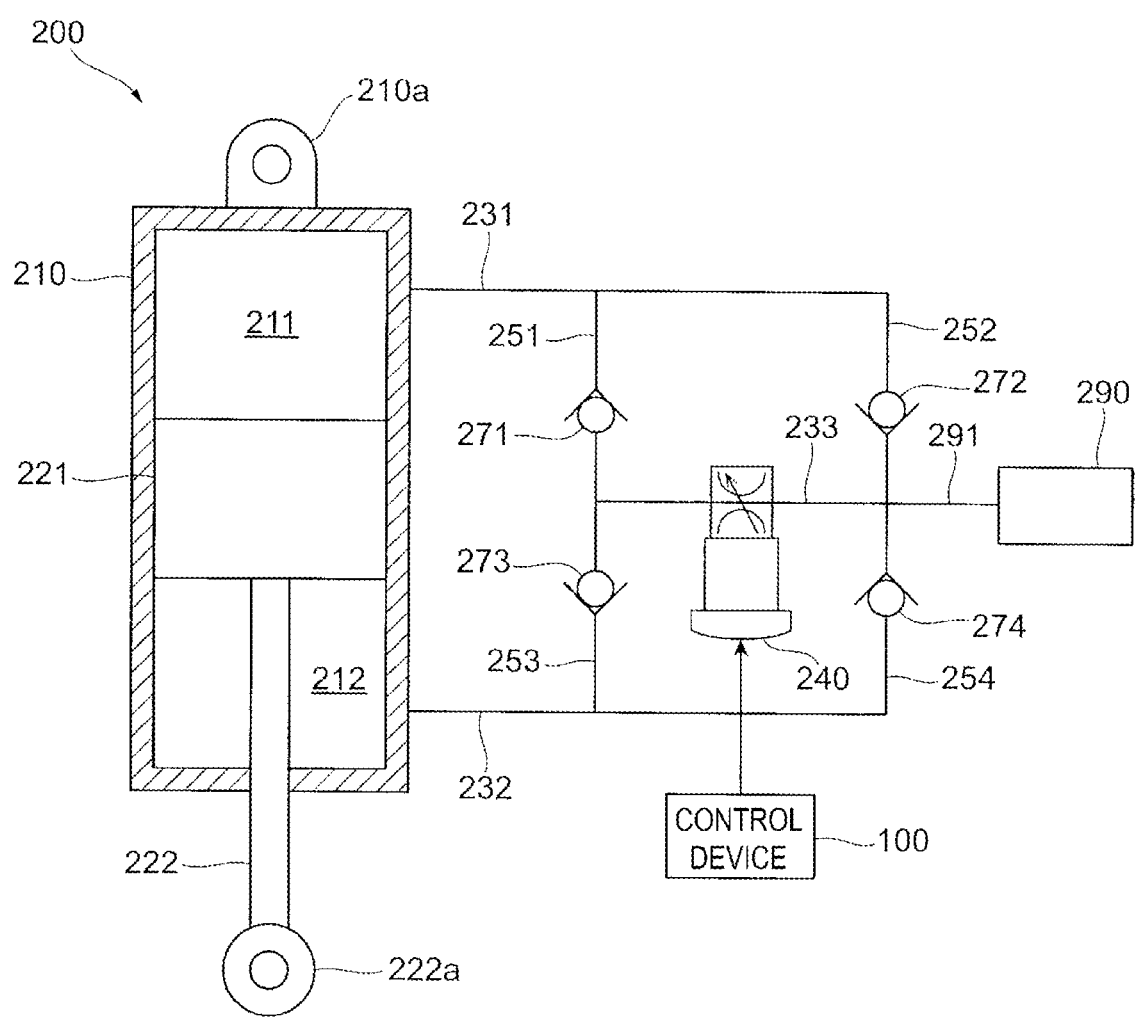
FIG. 2 is a diagram illustrating a schematic configuration of a damping device 200 according to the first embodiment.

FIG. 2 is a diagram illustrating a schematic configuration of a damping device 200 according to the first embodiment.

Figure 3:
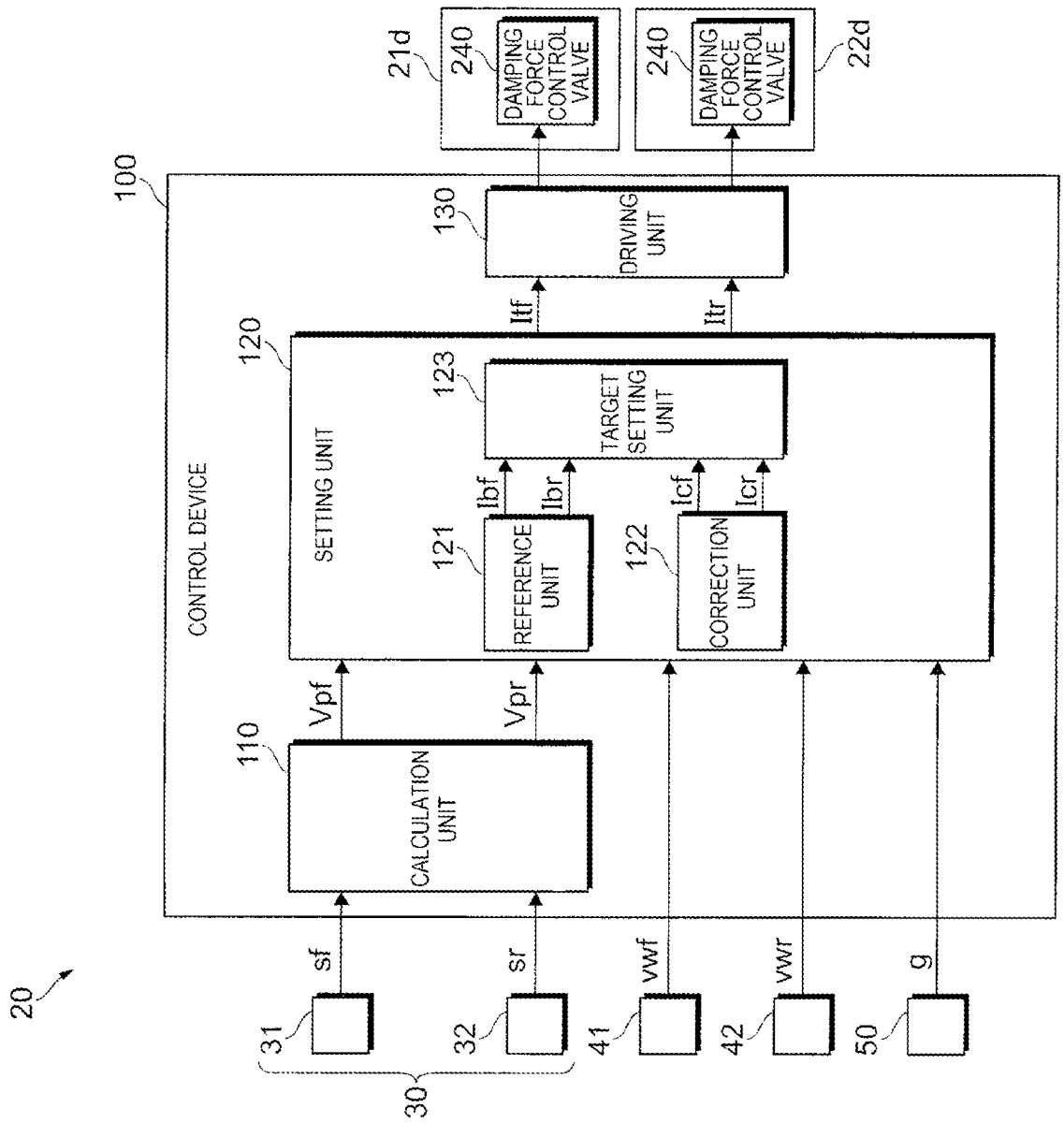
FIG. 3 is a diagram illustrating a schematic configuration of a control device 100 according to the first embodiment.

FIG. 3 is a diagram illustrating a schematic configuration of a control device 100 according to the first embodiment.

The motorcycle 1 includes a front wheel 2, which is a front vehicle wheel, a rear wheel 3, which is a rear vehicle wheel, and a vehicle main body 10. The vehicle main body 10 includes a vehicle body frame 11, a handle 12, a brake lever 13, and a seat 14 which form a framework of the motorcycle 1. A throttle grip 17, which is rotatable with respect to an axis of the handle 12 and instructs an acceleration of the motorcycle 1, is provided at a right end portion of the handle 12 when viewed from a driver seated on the seat 14.

The motorcycle 1 also includes a suspension 21 on a front wheel side which connects the front wheel 2 and the vehicle main body 10. The motorcycle 1 further includes two brackets 15 holding two suspensions 21 arranged on left and right sides of the front wheel 2, and a shaft 16 arranged between the two brackets 15. The suspension 21 includes a suspension spring 21s which absorbs an impact applied to the front wheel 2 from a road surface or the like, and a damping device 21d which dampens a vibration of the suspension spring 21s.

The motorcycle 1 further includes a suspension 22 on a rear wheel side. The suspension 22 includes a suspension spring 22s which absorbs an impact applied to the rear wheel 3 from a road surface or the like, and a damping device 22d which dampens a vibration of the suspension spring 22s.

In the following description, the damping device 21d and the damping device 22d may be collectively referred to as a "damping device 200".

The motorcycle 1 includes a stroke sensor 31 which detects an amount of extension/contraction of the suspension 21, and a stroke sensor 32 which detects an amount of extension/contraction of the suspension 22. In the following description, the stroke sensor 31 and the stroke sensor 32 may be collectively referred to as a "stroke sensor 30".

In addition, the motorcycle 1 includes a vehicle wheel speed sensor 41 which detects a rotational speed of the front wheel 2 and a vehicle wheel speed sensor 42 which detects a rotational speed of the rear wheel 3.

The motorcycle 1 includes a front-rear G sensor 50 as an example of a front-rear acceleration sensor which detects an acceleration of the motorcycle 1 in a front-rear direction.

The motorcycle 1 includes a control device 100 which controls a damping force of the damping device 21d and the damping device 22d using detection values of the stroke sensors 31, 32, the vehicle wheel speed sensors 41, 42, and the front-rear G sensor 50.

A suspension system 20 according to the present invention is a system including the suspensions 21, 22 and the control device 100.

The motorcycle 1 includes a brake device 60 on a front wheel 2 side. The brake device 60 includes a disk 61 which is provided on an outer peripheral side of a hub of the front wheel 2 and rotates integrally with the front wheel 2, and a caliper 62 which sandwiches the disk 61 and applies a braking force (frictional force) to the front wheel 2. In addition, the motorcycle 1 also includes a front-wheel side master cylinder (not illustrated) which supplies a brake pressure (hydraulic pressure) for sandwiching to the caliper 62.

The motorcycle 1 includes a disc type brake device 70 on a rear wheel 3 side. The brake device 70 includes a disk 71 which is provided on an outer peripheral side of a hub of the rear wheel 3 and rotates integrally with the rear wheel 3, and a caliper 72 which sandwiches the disk 71 and applies a braking force (frictional force) to the rear wheel 3. In addition, the motorcycle 1 further includes a brake pedal 73 and a rear-wheel side master cylinder (not illustrated) which supplies a brake pressure to the caliper 72 in response to an operation of the brake pedal 73.

The motorcycle 1 includes an antilock brake system 80 in the middle of a pipe connecting the front-wheel side master cylinder and the caliper 62 and in the middle of a pipe connecting the rear-wheel side master cylinder and the caliper 72. In order to avoid slip (lock) of the front wheel 2 and the rear wheel 3 during braking of the front wheel 2 and the rear wheel 3, the antilock brake system 80 controls the brake pressures of the caliper 62 and the caliper 72 so that a slip ratio becomes a desired slip ratio. In the following description, the antilock brake system 80 may be referred to as "ABS 80" in some cases.

Further, the motorcycle 1 includes a traction control system 90 which suppresses the slip of the rear wheel 3 by performing a control to reduce a driving torque of the rear wheel 3 when the slip of the rear wheel 3 as a driving wheel is detected. Examples of the control for reducing the driving torque of the rear wheels 3 performed by the traction control system 90 include a control for reducing an output torque of an engine (not illustrated) (hereinafter, referred to as "engine torque"), a control for applying brake to the rear wheels 3 with the brake device 70, or the like. Hereinafter, the traction control system 90 may be referred to as "TCS 90" in some cases.

(Damping Device)

The damping device 200 includes a cylinder 210 filled with operating oil, a piston 221, and a piston rod 222. An end portion 210a on one side (upper side in FIG. 2) of the cylinder 210 is connected to the vehicle main body 10. An end portion on one side of the piston rod 222 is held by the piston 221, and an end portion 222a on the other side thereof (lower side in FIG. 2) is connected to a vehicle wheel.

Since the piston 221 is accommodated in the cylinder 210, the cylinder 210 is divided into an oil chamber 211 in which a pressure of the operating oil is increased in a compression stroke and an oil chamber 212 in which the pressure of the operating oil increases in an extension stroke.

The damping device 200 includes a first oil passage 231 connected to the oil chamber 211 in the cylinder 210, and a second oil passage 232 connected to the oil chamber 212 in the cylinder 210. In addition, the damping device 200 includes a third oil passage 233 provided between the first oil passage 231 and the second oil passage 232, and a damping force control valve 240 provided in the third oil passage 233. The damping device 200 includes a first branch passage 251 which connects the first oil passage 231 and one end portion of the third oil passage 233, and a second branch passage 252 which connects the first oil passage 231 and the other end portion of the third oil passage 233. The damping device 200 includes a third branch passage 253 which connects the second oil passage 232 and the one end portion of the third oil passage 233, and a fourth branch passage 254 which connects the second oil passage 232 and the other end portion of the third oil passage 233.

The damping device 200 includes a first check valve 271 provided in the first branch passage 251 and a second check valve 272 provided in the second branch passage 252. In addition, the damping device 200 includes a third check valve 273 provided in the third branch passage 253 and a fourth check valve 274 provided in the fourth branch passage 254. The damping device 200 includes a reservoir 290 which has a function of storing operating oil and supplying and discharging the operating oil, and a reservoir passage 291 which connects the reservoir 290 and the other end portion of the third oil passage 233.

The damping force control valve 240 includes a solenoid, and the pressure of the operating oil passing through the valve can be controlled by controlling a current amount of currents energizing the solenoid. The damping force control valve 240 according to the present embodiment increases the pressure of the operating oil passing through the valve as the current amount supplied to the solenoid increases. The current amount of the current energizing the solenoid is controlled by the control device 100.

When the piston 221 moves toward the oil chamber 211, an oil pressure in the oil chamber 211 increases. Then, the operating oil in the oil chamber 211 flows toward the damping force control valve 240 via the first oil passage 231 and the first branch passage 251. The pressure of the operating oil passing through the damping force control valve 240 is adjusted by a valve pressure of the damping force control valve 240, so that a damping force on a compression side is adjusted. The operating oil, which has passed through the damping force control valve 240, flows into the oil chamber 212 via the fourth branch passage 254 and the second oil passage 232.

On the other hand, when the piston 221 moves toward the oil chamber 212, an oil pressure in the oil chamber 212 increases. Then, the operating oil in the oil chamber 212 flows toward the damping force control valve 240 via the second oil passage 232 and the third branch passage 253. The pressure of the operating oil passing through the damping force control valve 240 is adjusted by the valve pressure of the damping force control valve 240, so that a damping force on an extension side is adjusted. The operating oil, which has passed through the damping force control valve 240, flows into the oil chamber 211 via the second branch passage 252 and the first oil passage 231.

(Control Device 100)

The control device 100 is an arithmetic and logical operation circuit including a CPU, a ROM, a RAM, a backup RAM, or the like.

As illustrated in FIG. 3, a stroke signal sf on the front wheel side, which is obtained by converting a stroke amount of the suspension 21 detected by the stroke sensor 31 into an output signal, is input to the control device 100. A stroke signal sr on the rear wheel side, which is obtained by converting a stroke amount of the suspension 22 detected by the stroke sensor 32 into an output signal, is input to the control device 100. Further, a rotational speed signal vwf on the front wheel side, which is obtained by converting the rotational speed of the front wheel 2 detected by the vehicle wheel speed sensor 41 into an output signal, is input to the control device 100. A rotational speed signal vwr on the rear wheel side, which is obtained by converting a rotational speed of the rear wheel 3 detected by the vehicle wheel speed sensor 42 into an output signal, is input to the control device 100. An output signal g or the like, which are obtained by converting the acceleration of the vehicle main body 10 in the front-rear direction detected by the front-rear G sensor 50 into an output signal, is input to the control device 100.

The control device 100 controls the damping force by controlling the current amount supplied to the solenoid of the damping force control valve 240. Specifically, the control device 100 increases the current amount supplied to the solenoid of the damping force control valve 240 when the damping force is increased and the control device 100 reduces the current amount supplied to the solenoid of the damping force control valve 240 when the damping force is decreased.

The control device 100 includes a calculation unit 110 which calculates a velocity Vpf, which is a velocity of a change in the stroke amount of the suspension 21, and a velocity Vpr, which is a velocity of a change in the stroke amount of the suspension 22, by using the stroke signals sf, sr from the stroke sensor 30. The control device 100 includes a setting unit 120 which sets target current Itf, Itr to be supplied to the solenoid of the damping force control valve 240, and a driving unit 130 which drives the damping force control valve 240.

The calculation unit 110 calculates an amount of change in the stroke amount of the suspension 21 per unit time, thereby calculating the velocity Vpf on the front wheel side. In addition, the calculation unit 110 calculates an amount of change in the stroke amount of the suspension 22 per unit time, thereby calculating the velocity Vpr on the rear wheel side. In the following description, a sign of a velocity Vp in an extension direction of the suspensions 21, 22 is positive, and the sign of the velocity Vp in a compression direction of the suspensions 21, 22 is negative.

The setting unit 120 will be described in detail later.

The driving unit 130 includes, for example, a transistor (field effect transistor: FET) as a switching element which is connected between a positive electrode side line of a power source and a coil of the solenoid of the damping force control valve 240.

More specifically, the driving unit 130 performs a switching operation of the transistor so that target current to be supplied to the damping force control valve 240 of the damping device 21*d* becomes the target current Itf set by the setting unit 120. In addition, the driving unit 130 performs a switching operation of the transistor so that the target current to be supplied to the damping force control valve 240 of the damping device 22*d* becomes the target current Itr set by the setting unit 120.

(Setting Unit 120)

The setting unit 120 sets the target current Itf on the front wheel side to be supplied to the solenoid of the damping force control valve 240 of the damping device 21*d* based on the velocity Vpf or the like calculated by the calculation unit 110. The setting unit 120 sets the target current Itr on the rear wheel side to be supplied to the solenoid of the damping force control valve 240 of the damping device 22*d* based on the velocity Vpr or the like calculated by the calculation unit 110.

The setting unit 120 includes a reference unit 121 which sets reference currents Ibf, Ibr which serve as a reference for setting the target currents Itf, Itr. The setting unit 120 includes a correction unit 122 which sets correction currents Icf, Icr for correcting the reference currents Ibf, Ibr in accordance with a traveling state of the motorcycle 1.

In addition, the setting unit 120 includes a target setting unit 123 which finally sets the target currents Itf, Itr, by adding the reference currents Ibf, Ibr set by the reference unit 121 and the correction currents Icf, Icr set by the correction unit 122.

Figure 4:
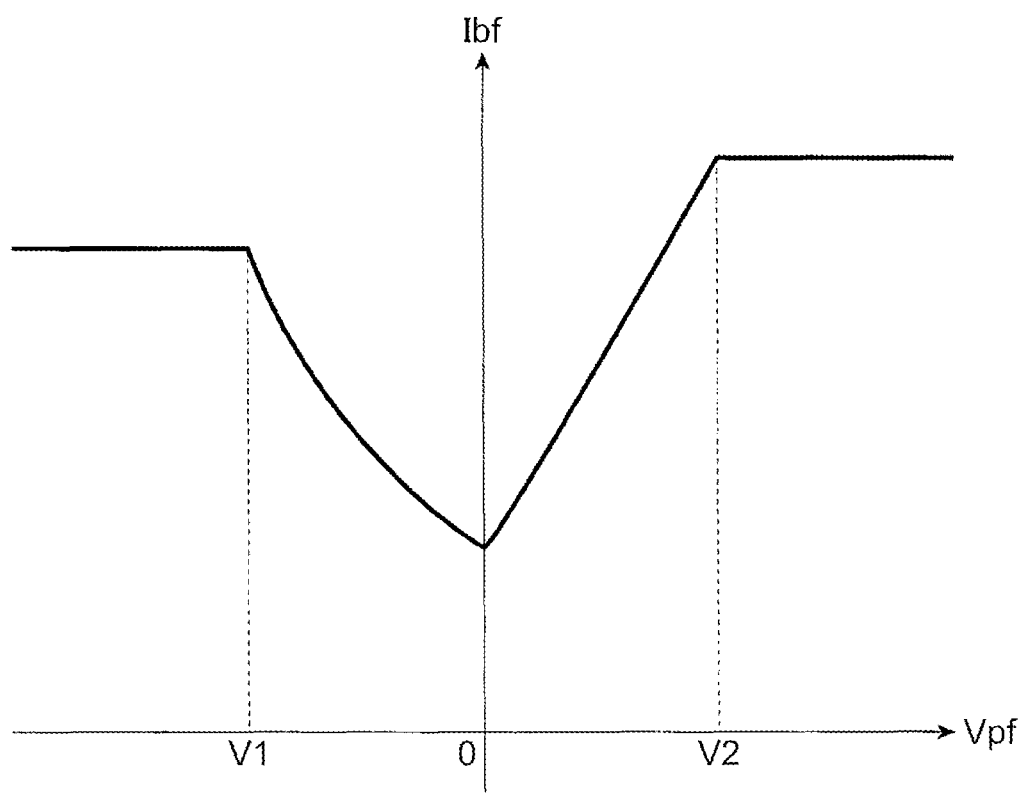
FIG. 4 is a schematic diagram of a control map illustrating an example of a relationship between a reference current Ibf and a velocity Vpf.

FIG. 4 is a schematic diagram of a control map illustrating an example of a relationship between the reference current Ibf and the velocity Vpf.

The reference unit 121 calculates the reference current Ibf corresponding to the velocity Vpf. For example, the reference unit 121 calculates the reference current Ibf by substituting the velocity Vpf into the control map illustrated in FIG. 4 which illustrates the relationship between the reference current Ibf and the velocity Vpf, which is created in advance based on an empirical rule and recorded in the ROM.

In the control map illustrated in FIG. 4, in a case where the velocity Vpf is negative, when the velocity Vpf is equal to or greater than a first predetermined velocity V1, the less the velocity Vpf is, the greater the current amount is, whereas when the velocity Vpf is less than the first predetermined velocity V1, the current amount is set to be constant. In a case where the velocity Vpf is positive, when the velocity Vpf is equal to or less than a second predetermined velocity V2, the greater the velocity Vpf is, the greater the current amount is, whereas when the velocity Vpf is greater than the second predetermined velocity V2, the current amount is set to be constant.

Since a method of calculating the reference current Ibr by the reference unit 121 is the same as a method of calculating the reference current Ibf, a detailed description thereof will be omitted. Since a control map illustrating an example of a relationship between the reference current Ibr and the velocity Vpf is the same as a control map illustrating the example of the relationship between the reference current Ibf and the velocity Vpf, a detailed description thereof will be omitted. However, in the control map illustrating the relationship between the reference current Ibr and the velocity Vpr, specific values of the first predetermined velocity V1, the second predetermined velocity V2, and the constant current amount may be the same as or different from the case of the control map illustrating the relationship between the reference current Ibf and the velocity Vpf.

(Correction Unit 122)

Figure 5:
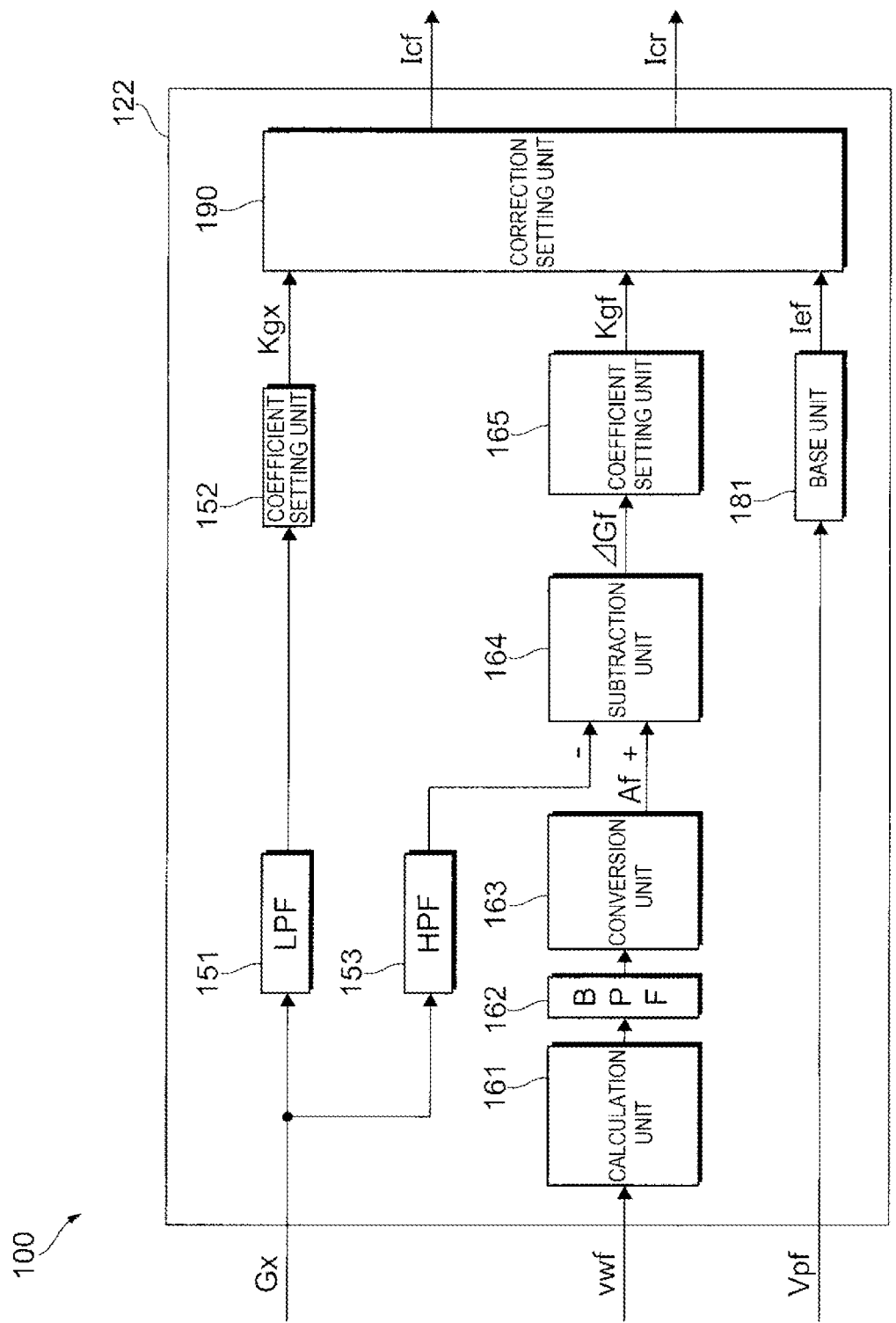
FIG. 5 is a diagram illustrating a schematic configuration of a correction unit 122 according to the first embodiment.

FIG. 5 is a diagram illustrating a schematic configuration of the correction unit 122 according to the first embodiment.

Figure 6:
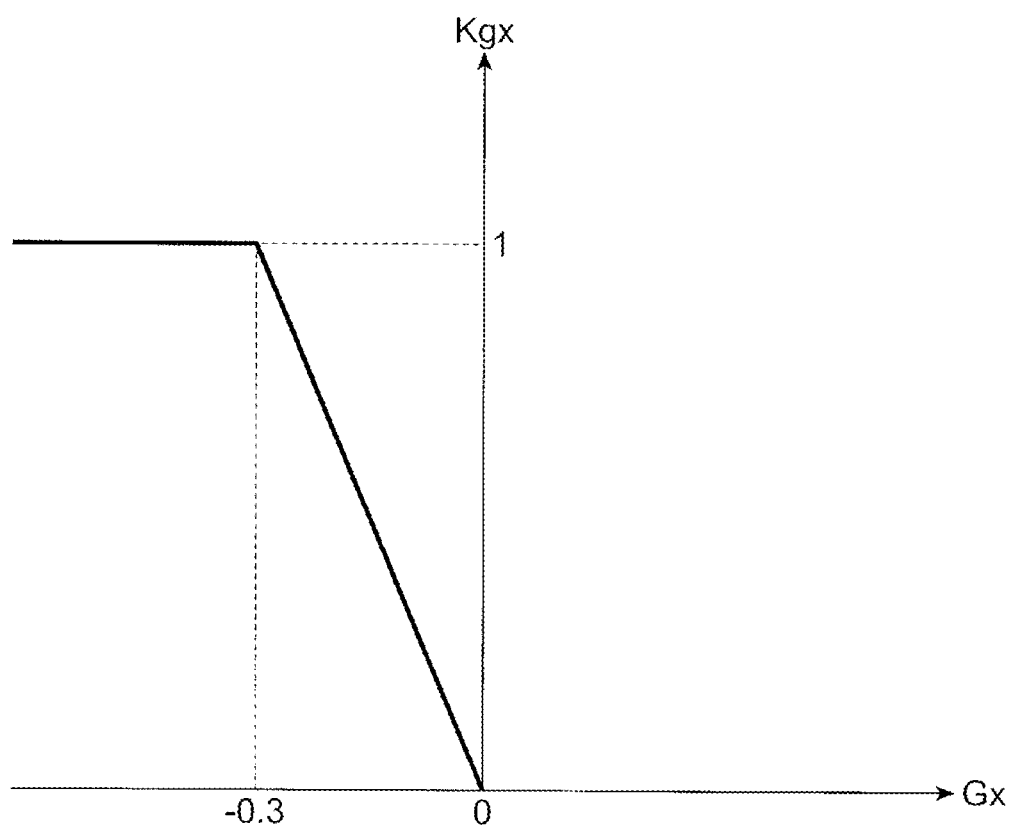
FIG. 6 is a schematic diagram of a control map illustrating an example of a relationship between a front-rear acceleration Gx and a correction coefficient Kgx.

FIG. 6 is a schematic diagram of a control map illustrating an example of a relationship between a front-rear acceleration Gx and a correction coefficient Kgx.

Figure 7:
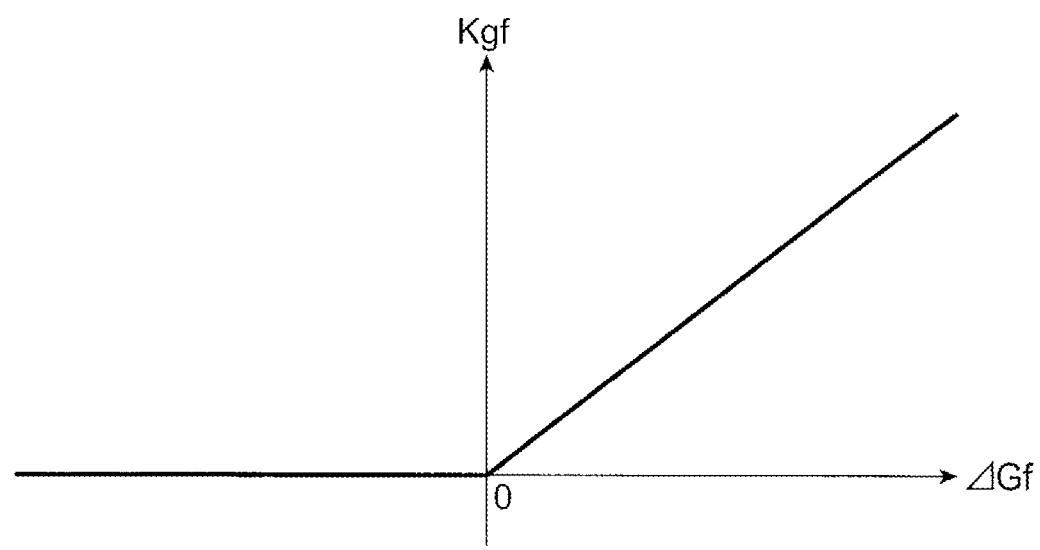
FIG. 7 is a schematic diagram of a control map illustrating an example of a relationship between an acceleration difference ΔGf and a correction coefficient Kgf.

FIG. 7 is a schematic diagram of a control map illustrating an example of a relationship between an acceleration difference ΔGf and a correction coefficient Kgf.

Figure 8:
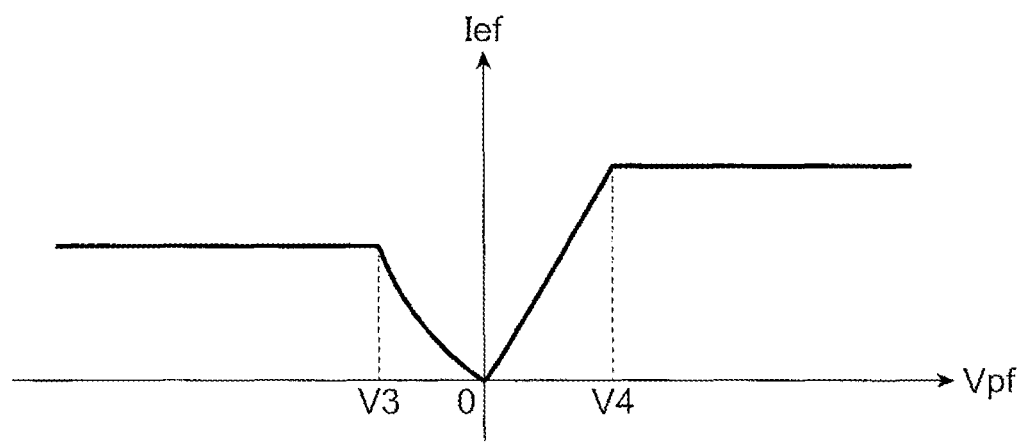
FIG. 8 is a schematic diagram of a control map illustrating an example of a relationship between a base current Ief and the velocity Vpf.

FIG. 8 is a schematic diagram of a control map illustrating an example of a relationship between a base current Ief and the velocity Vpf.

The correction unit 122 includes an LPF 151 which performs a filtering processing corresponding to a low-pass filter on the front-rear acceleration Gx detected by the front-rear G sensor 50. The correction unit 122 includes a coefficient setting unit 152 which sets a correction coefficient Kgx corresponding to the front-rear acceleration Gx after the filtering processing, which is output from the LPF 151. In addition, the correction unit 122 includes an HPF 153 which performs a filtering process corresponding to a high-pass filter on the front-rear acceleration Gx detected by the front-rear G sensor 50.

For example, the coefficient setting unit 152 calculates the correction coefficient Kgx by substituting the front-rear acceleration Gx into the control map illustrated in FIG. 6 illustrating the relationship between the front-rear acceleration Gx and the correction coefficient Kgx, which is created in advance based on an empirical rule and recorded in the ROM. In the control map illustrated in FIG. 6, when the front-rear acceleration Gx is less than 0 (g), the correction coefficient Kgx is positive, and when the front-rear acceleration Gx is equal to or greater than 0 (g), the correction coefficient Kgx is 0. When the front-rear acceleration Gx is equal to or less than −0.3 (g), the correction coefficient Kgx is 1, and the correction coefficient Kgx decreases from 1 to 0 as the front-rear acceleration Gx increases from −0.3 (g) to 0 (g).

The correction unit 122 includes a calculation unit 161 which calculates a rotational acceleration of the front wheel 2, and a BPF 162 which performs a filtering processing corresponding to a band-pass filter on the rotational acceleration calculated by the calculation unit 161. In addition, the correction unit 122 includes a conversion unit 163 which converts a unit of the rotational acceleration after the filtering processing, which is output from the BPF 162, into a gravitational acceleration (g). The calculation unit 161 calculates the rotational acceleration (km/h/s) of the front wheel 2 using the rotational speed signal vwf from the vehicle wheel speed sensor 41 (by differentiating). The conversion unit 163 converts the unit of the rotational acceleration (km/h/s) of the front wheel 2 after the filtering processing by the BPF 162, which is calculated by the calculation unit 161, into the gravitational acceleration (g), and outputs the converted value. Hereinafter, a value of the rotational acceleration of the front wheel 2 after the conversion, in which the unit is converted into the gravitational acceleration (g) by the conversion 163, may be referred to as a front wheel acceleration Af (g).

The correction unit 122 includes a subtraction unit 164 which subtracts the front-rear acceleration Gx after the filtering processing output from the HPF 153 from the front wheel acceleration Af output from the conversion unit 163. The correction unit 122 includes a coefficient setting unit 165 which sets a correction coefficient Kgf corresponding to an acceleration difference ΔGf (=Af−Gx) after subtraction by the subtraction unit 164.

For example, the coefficient setting unit 165 calculates the correction coefficient Kgf by substituting the acceleration difference ΔGf into the control map illustrated in FIG. 7 illustrating the relationship between the acceleration difference ΔGf and the correction coefficient Kgf, which is created in advance based on an empirical rule and recorded in the ROM. In the control map illustrated in FIG. 7, the correction coefficient Kgf is 0 when the acceleration difference ΔGf is equal to or less than 0 (g), and is a positive value proportional to the acceleration difference ΔGf when the acceleration difference ΔGf is greater than 0 (g).

The correction unit 122 includes a base unit 181 which sets the base current Ief serving as a base of the correction current Icf according to the velocity Vpf.

For example, the base unit 181 sets the base current Ief by substituting the velocity Vpf into the control map illustrated in FIG. 8 illustrating the relationship between the base current Ief and the velocity Vpf, which is created in advance based on an empirical rule and recorded in the ROM. In the control map illustrated in FIG. 8, in a case where the velocity Vpf is negative, when the velocity Vpf is equal to or greater than a third predetermined velocity V3, the smaller the velocity Vpf is, the greater the current amount is, and when the velocity Vpf is less than the third predetermined velocity V3, the current amount is set to be constant. In addition, in a case where the velocity Vpf is positive, when the velocity Vpf is equal to or less than a fourth predetermined velocity V4, the greater the velocity Vpf is, the greater the current amount is, and when the velocity Vpf is greater than the fourth predetermined velocity V4, the current amount is set to be constant. Note that, regardless of the velocity Vpf, it can be exemplified that the base current Ief is a positive current amount less than the reference current Ibf.

The LPF 151 performs the filtering processing which does not attenuate components having a frequency lower than a cutoff frequency but attenuates components having a frequency higher than the cutoff frequency among output values from the front-rear G sensors 50. The LPF 151 has a function of cancelling a noise of the output value from the front-rear G sensor 50 and matching a time constant.

The HPF 153 performs the filtering processing which does not attenuate components having a frequency higher than the cutoff frequency but attenuate components having a frequency lower than the cutoff frequency among the output values from the front-rear G sensor 50. As described above, since the subtraction unit 164 subtracts the front-rear acceleration Gx from the front wheel acceleration Af, the HPF 153 has a function of removing temporal deviation between values of both accelerations. Instead of the HPF 153, a filter which does not pass (attenuate) a frequency lower than a desired frequency, does not pass (attenuate) a frequency higher than the desired frequency, and performs a filtering processing corresponding to a band-pass filter may be used. In addition, a filter which performs a filtering processing corresponding to the low-pass filter may be additionally provided at a latter stage of the HPF 153 and a preceding stage the subtraction unit 164. In addition, a filter which performs a filtering processing corresponding to the low-pass filter may be added to the preceding stage of the HPF 153.

The BPF 162 performs a filtering processing in which only a desired frequency band is passed, and other frequencies are not passed (attenuated). The BPF 162 has a function of cancelling an offset of the output value from the calculation unit 161, cancelling a noise, and matching the time constant. The BPF 162 may be configured by combining separate elements each having a function of performing a filtering processing corresponding to the high-pass filter which does not pass (attenuate) a frequency lower than a desired frequency, and a function of performing a filtering processing corresponding to the low-pass filter which does not pass (attenuate) a frequency higher than the desired frequency. Note that, instead of the BPF 162, a filter, which performs the filtering processing corresponding to a high-pass filter, may be provided. In addition, instead of the BPF 162, a filter, which performs the filtering processing corresponding to a low-pass filter, may be provided.

The correction unit 122 includes a correction setting unit 190 which sets the correction current Icf and the correction current Icr using the correction coefficient Kgx set by the coefficient setting unit 152, the correction coefficient Kgf set by the coefficient setting unit 165, and the base current Ief set by the base unit 181.

The correction setting unit 190 sets a value obtained by multiplying the correction coefficient Kgx, the correction coefficient Kgf, and the base current Ief as the correction current Icf (Icf=Kgx×Kgf×Ief).

In addition, the correction setting unit 190 sets the correction current Icr to 0.

The LPF 151, the coefficient setting unit 152, the HPF 153, the calculation unit 161, the BPF 162, the conversion unit 163, the subtraction unit 164, the coefficient setting unit 165, the base unit 181, and the correction setting unit 190 described above repeatedly perform the above processing every predetermined period (for example, 1 millisecond).

The control device 600 configured as described above operates as follows.

Figure 9:
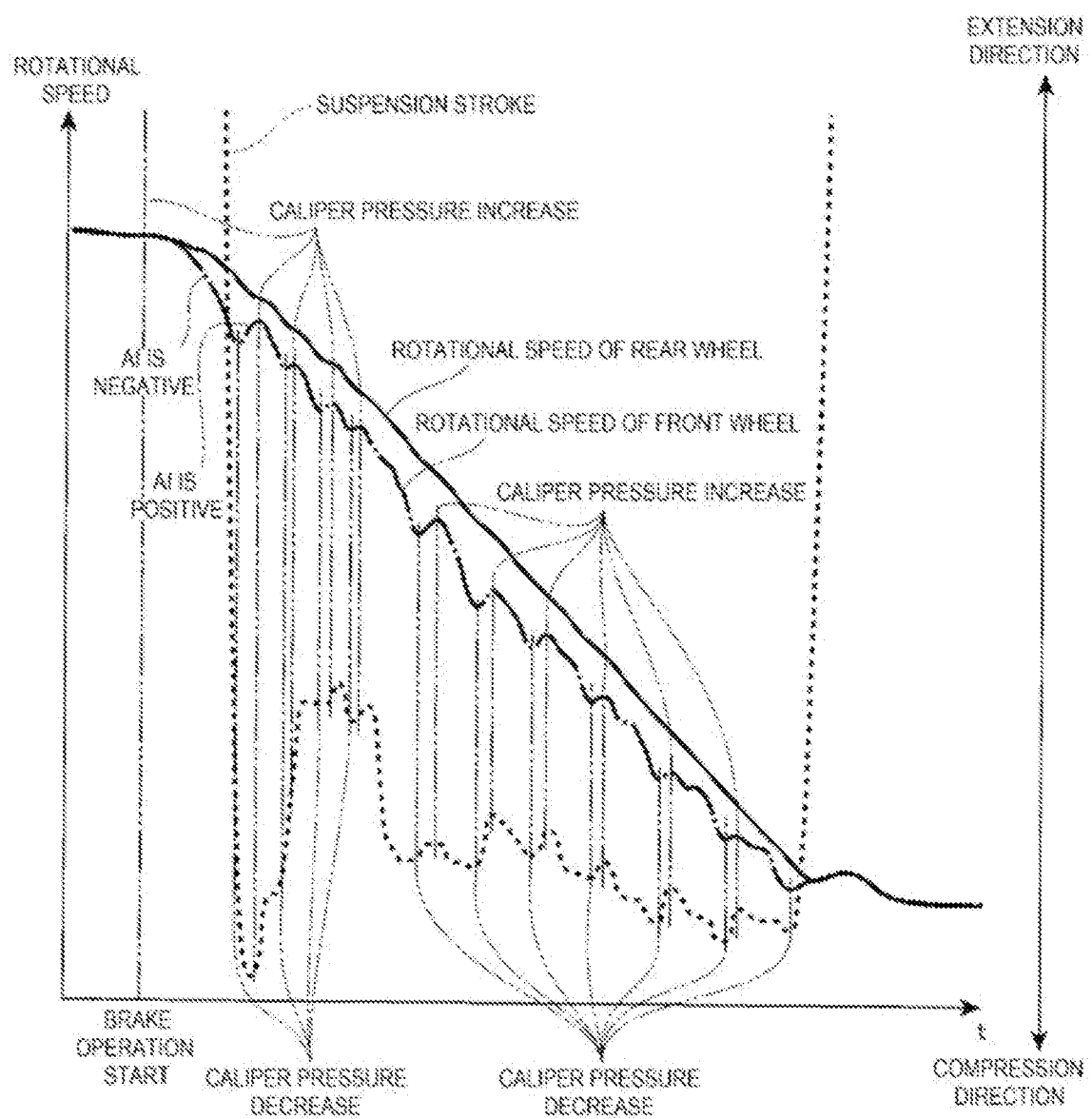
FIG. 9 is a diagram illustrating a behavior when a brake operation is performed in a first comparative vehicle.

FIG. 9 is a diagram illustrating a behavior when a brake operation is performed in a first comparative vehicle.

Figure 10:
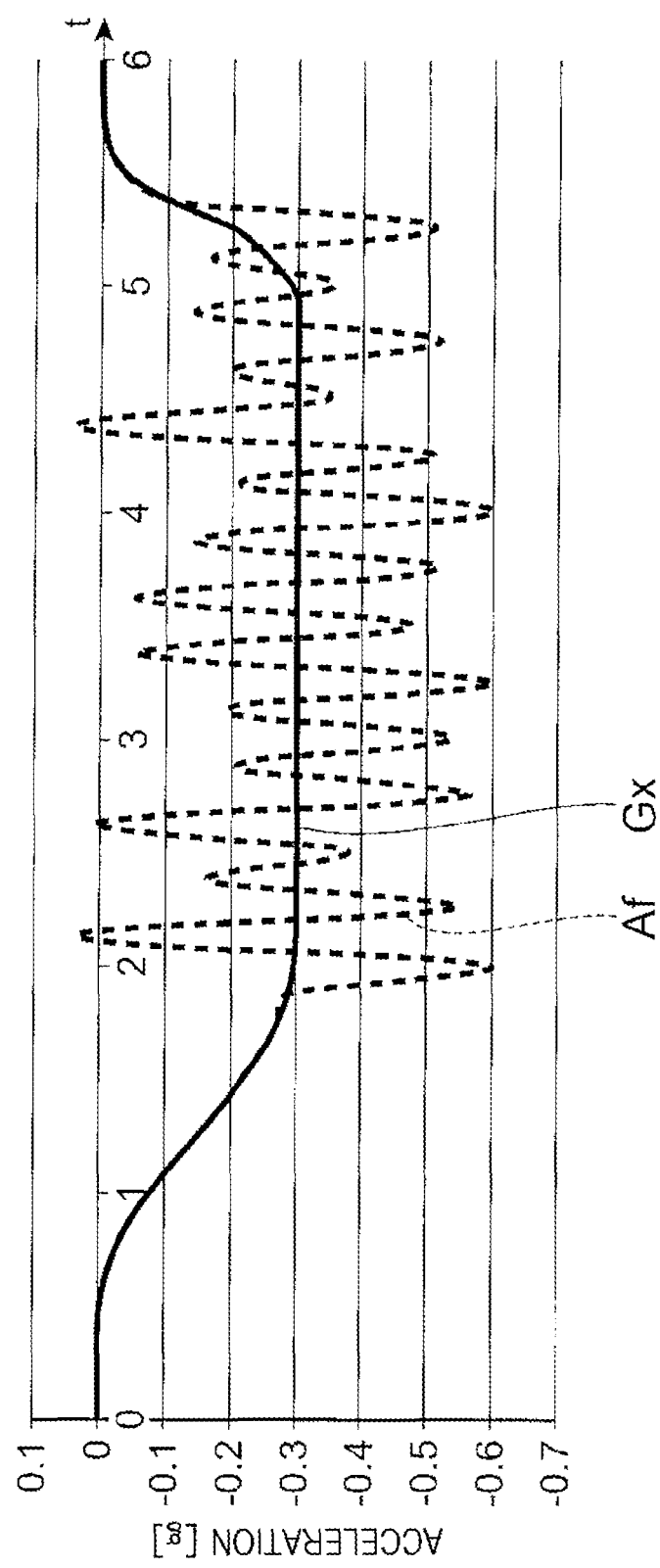
FIG. 10 is a diagram illustrating a time change between the front-rear acceleration Gx and a front wheel acceleration Af when a brake operation is performed in a first comparative vehicle.

FIG. 10 is a diagram illustrating a time change between the front-rear acceleration Gx and a front wheel acceleration Af when a brake operation is performed in a first comparative vehicle.

Figure 11:
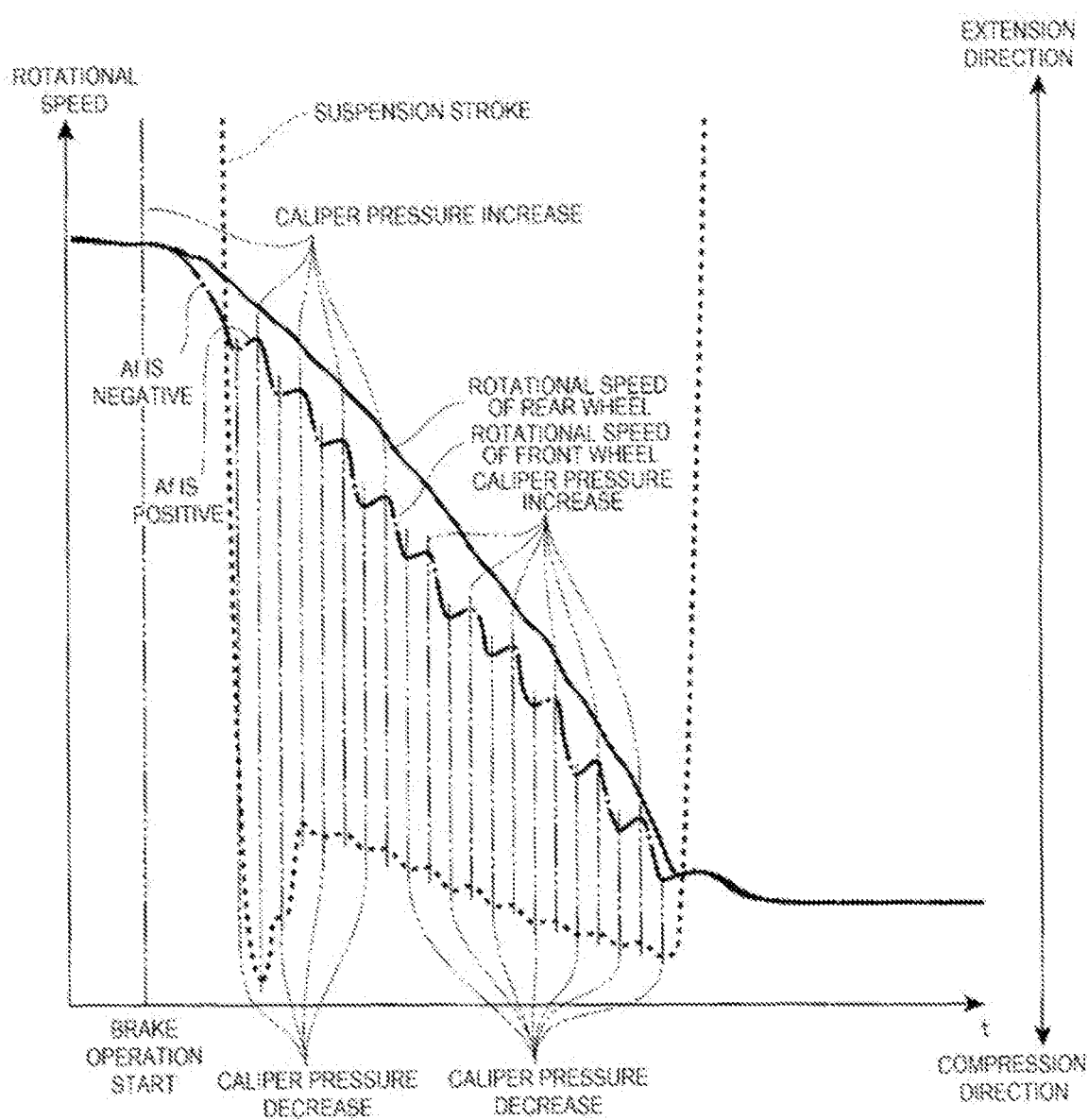
FIG. 11 is a diagram illustrating a behavior when a brake operation is performed in the motorcycle 1.

FIG. 11 is a diagram illustrating a behavior when a brake operation is performed in the motorcycle 1.

In the following, a motorcycle, which is not provided with the correction unit 122 of the control device 100 and is not applied with the correction currents Icf, Icr, will be referred to as a first comparative vehicle with respect to the motorcycle 1.

In the first comparative vehicle, when a sudden brake operation is started by suddenly gripping the brake lever 13, the brake pressure of the caliper 62 increases, and a braking torque acts on the front wheel 2. As a result, as illustrated in FIG. 9, the rotational speed of the front wheel 2 is rapidly less than the rotational speed of the rear wheel 3. Thereafter, when the slip ratio of the front wheel 2 reaches a set value, the brake pressure of the caliper 62 is reduced by the ABS 80, and the braking torque is reduced. When the front wheel 2 starts to accelerating due to the decrease in the braking torque and the slip ratio of the front wheel 2 decreases, the brake pressure is increased in order to increase the braking torque again. The above cycle is repeated until the first comparative vehicle stops.

When attention is paid to the front wheel acceleration Af, the brake pressure of the caliper 62 is increased to increase the braking torque, so that the front wheel acceleration Af is less than the front-rear acceleration Gx. Thereafter, when the brake pressure of the caliper 62 is reduced by the ABS 80, the braking torque is decreased and the acceleration of the front wheel 2 is increased, so that the front wheel acceleration Af is greater than the front-rear acceleration Gx. The front-rear acceleration Gx is negative until the first comparative vehicle stops after the brake operation is performed.

When attention is paid to the suspension 21 on the front wheel 2 side, the suspension 21 contracts when the braking torque of the front wheel 2 is increased, and then the suspension 21 extends by decreasing the braking torque and increasing the front wheel acceleration Af. Therefore, after the sudden brake operation is performed, the cycle of increasing and decreasing the braking torque is repeated until the first comparative vehicle stops, so that an extension operation and a contraction operation of the suspension 21 are repeated, and a vibration is likely to occur.

In the motorcycle 1, when the front wheel acceleration Af is greater than the front-rear acceleration Gx (when the acceleration difference ΔGf is greater than 0), the coefficient setting unit 165 sets the correction coefficient Kgf to a value (positive value) greater than 0. When the brake operation is performed, the front-rear acceleration Gx is smaller than 0 (negative value), so that the coefficient setting unit 152 sets the correction coefficient Kgx to a value (positive value) greater than 0. When the velocity Vpf is a value smaller than 0 and the velocity Vpf is a value greater than 0, the base unit 181 sets the base current Ief to a value (positive value) greater than 0.

Therefore, when the front wheel acceleration Af is greater than the front-rear acceleration Gx, the correction setting unit 190 sets a positive correction current Icf. As a result, the ABS 80 operates (the brake pressure of the caliper 62 is reduced), the target current Itf (=Ibf+Icf) at a time when the braking torque of the front wheel 2 decreases and the suspension 21 extends increases, and the damping force of the damping device 21*d* increases. As a result, when the ABS 80 operates to decrease the braking torque of the front wheel 2, the suspension 21 is less likely to extend. Thus, even if the ABS 80 operates and the cycle of increasing and decreasing the braking torque is repeated until the motorcycle 1 stops after the sudden brake operation is performed, a vibration hardly occurs. In addition, even if the vibration occurs, an amplitude becomes small. That is, according to the control device 100, even when the sudden brake operation is performed, the behavior of the motorcycle 1 is stabilized. Therefore, a steering feeling is improved.

In a case where the sudden brake operation is performed, when the suspension 21 becomes difficult to extend as the braking torque is decreased due to the brake pressure being reduced by the ABS 80, then the braking pressure is increased again and a spring force when the braking torque is increased increases. As a result, a ground contact load of the front wheel 2 with the road surface increases at an early stage. When the brake pressure is increased again to increase the braking torque and the slip ratio reaches the set value, the brake pressure is reduced by the ABS 80. As a result, a period of the cycle, in which the brake pressure is increased again after the brake pressure is reduced and thereafter the brake pressure is reduced again, is shortened, so that a period in which the suspension 21 is switched to an operation in the extension direction, an operation in the compression direction, and the operation in the extension direction is shortened. In addition, since the cycle is shortened, the motorcycle 1 is stopped at an early stage.

As described above, according to the control device 100, even when the sudden brake operation is performed, the amplitude of the vibration can be reduced, and the period of the vibration can be further shortened. As a result, the behavior of the motorcycle 1 is stabilized, and a driver hardly feels rocking. Therefore, by including the control device 100, it is possible to provide the motorcycle 1 capable of stabilizing the behavior when a sudden brake operation is performed and improving the steering feeling.

As described above, the control device 100 controls the damping force of the damping device 21d which dampens the force generated between the vehicle main body 10 and the front wheel 2 as an example of the vehicle wheel using a difference between the front-rear acceleration Gx of the vehicle main body 10 and the front wheel acceleration Af as an example of the rotational acceleration of the front wheel 2.

As exemplified in the case where the sudden brake operation is performed, the front-rear acceleration Gx and the front wheel acceleration Af become indications for grasping the behavior of the motorcycle 1. Therefore, by controlling the damping force of the damping device 21d using these values, the behavior of the vehicle can be stabilized.

For example, when the front-rear acceleration Gx is less than 0 (g), that is, when the vehicle main body 10 is decelerating, a situation, in which the front wheel acceleration Af is greater than the front-rear acceleration Gx, is a situation which does not occur when the brake operation is not performed. In such a situation, it is possible to suppress instability of the operation of the suspension 21 by increasing the damping force of the damping device 21d.

When the front wheel 2 is accelerating while the vehicle main body 10 is decelerating, since it is considered that the suspension 21 is operating in the extension direction even though the vehicle main body 10 is decelerating, it is possible to suppress the instability of the operation of the suspension 21 by increasing the damping force in the extension direction of the damping device 21d.

The control device 100 can also be regarded as a device which determines whether the ABS 80 is operating (the brake pressure of the caliper 62 is reduced) so as to control a slip state of the front wheel 2 by controlling the brake device 60 as an example of a braking device capable of adjusting the braking torque generated on the front wheel 2. When the control device 100 determines that the ABS 80 is operating, the control device 100 increases the damping force as compared with the case where the ABS 80 is not determined to be operating. When the front-rear acceleration Gx is less than 0 (g), that is, when the vehicle main body 10 is decelerating, in a case where the front wheel acceleration Af is greater than the front-rear acceleration Gx, the control device 100 determines that the ABS 80 is operating to control the slip state of the front wheel 2 by controlling the brake device 60.

As a result of intensive studies by the present inventors, it has been found that when the brake pressure of the caliper 62 is reduced by the ABS 80, for example, when the front-rear acceleration Gx is equal to or less than −0.3 (g), a specific situation in which the front wheel acceleration Af is equal to or greater than 0.1 (g) may occur. Therefore, for example, when the front-rear acceleration Gx is equal to or less than −0.3 (g) and the front wheel acceleration Af is larger than the front-rear acceleration Gx, the damping force in the extension direction of the damping device 21d is increased, so that the vibration caused by the brake pressure being reduced by the ABS 80 during the sudden brake operation can be suppressed with high accuracy.

In the first embodiment described above, the correction unit 122 may set the correction current Icf in consideration of a vehicle speed which is a moving speed of the motorcycle 1. For example, when the vehicle speed is less than 5 (km/h), for example, the correction unit 122 may set the correction current Icf to 0, and when the vehicle speed is equal to or greater than 5 (km/h), for example, the correction unit 122 may set the correction current Icf set as described above as a final correction current Icf.

In addition, the correction unit 122 may not output the correction current Icr instead of outputting 0 as the correction current Icr.

Second Embodiment

Figure 12:
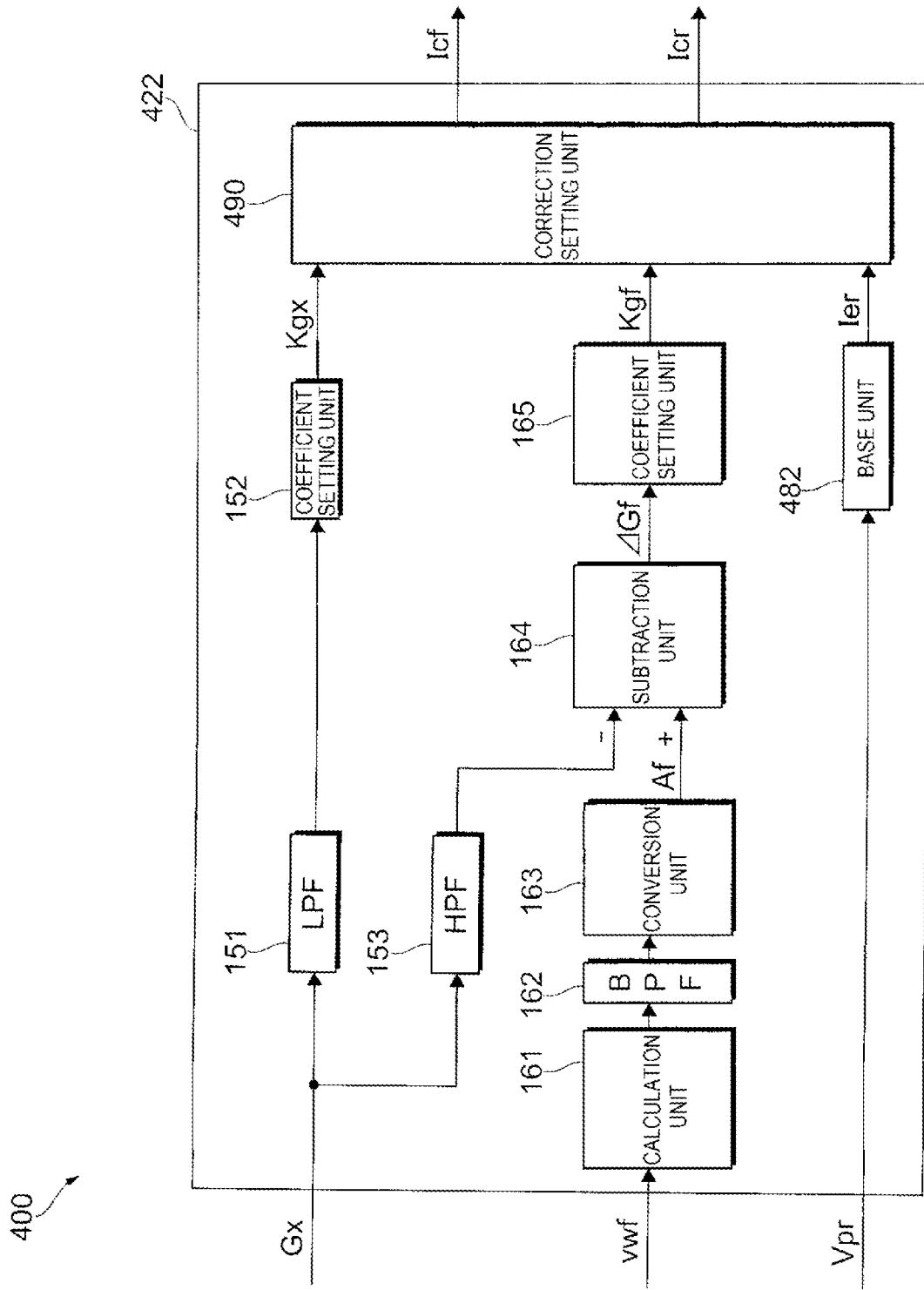
FIG. 12 is a diagram illustrating a schematic configuration of a correction unit 422 of a control device 400 according to a second embodiment.

FIG. 12 is a diagram illustrating a schematic configuration of a correction unit 422 of a control device 400 according to a second embodiment.

The control device 400 according to the second embodiment differs from the control device 100 according to the first embodiment in the correction unit 422 corresponding to the correction unit 122. Hereinafter, differences from the control device 100 will be described. Components having the same function are denoted by the same reference numerals in the control device 100 and the control device 400, and a detailed description thereof will be omitted.

The correction unit 422 includes a base unit 482 which sets a base current Ier serving as a base of the correction current Icr in accordance with the velocity Vpr, instead of the base unit 181 included in the correction unit 122. Since a method of calculating the base current Ier by the base unit 482 is the same as the method of calculating the base current Ief by the base unit 181, a detailed description thereof will be omitted. Since a control map illustrating an example of a relationship between the base current Ier and the velocity Vpr is the same as a control map illustrating an example of a relationship between the base current Ief and the velocity Vpf, a detailed description thereof will be omitted. However, specific values of the third predetermined velocity V3, the fourth predetermined velocity V4, and the constant current amount may be the same as or different from those of the control map illustrating an example of the relationship between the base current Ief and the velocity Vpf. Note that, regardless of the velocity Vpr, it can be exemplified that the base current Ier is a positive current amount less than the reference current Ibr.

The correction unit 422 includes a correction setting unit 490 which sets a value obtained by multiplying the correction coefficient Kgx set by the coefficient setting unit 152, the correction coefficient Kgf set by the coefficient setting unit 165, and the base current Ier set by the base unit 482 as the correction current Icr (=Kgx×Kgf×Ier), instead of the correction setting unit 190. The correction setting unit 490 sets the correction current Icf to 0.

The base unit 482 and the correction setting unit 490 described above repeatedly perform the above processing every predetermined period (for example, 1 millisecond).

In the first comparative vehicle, in a case where a sudden brake operation is performed by suddenly gripping the brake lever 13, when attention is paid to the suspension 22 on the rear wheel side, the suspension 22 extends when the braking torque of the front wheel 2 is increased, and then the suspension 22 contracts by decreasing the braking torque and accelerating the front wheel 2. Therefore, after the sudden brake operation is performed, the cycle of increasing and decreasing the braking torque is repeated until the first comparative vehicle stops, so that an extension operation and a contraction operation of the suspension 22 are repeated, and a vibration is likely to occur.

On the other hand, in the motorcycle having the control device 400 according to the second embodiment, the base unit 482 sets the base current Ier to a value (positive value) greater than 0 when the velocity Vpr is a value smaller than 0 and when the velocity Vpr is a value greater than 0. Therefore, when the front wheel acceleration Af is greater than the front-rear acceleration Gx, the correction setting unit 490 sets a positive correction current Icr. As a result, the ABS 80 operates (the brake pressure of the caliper 62 is reduced), the target current Itr (=Ibr+Icr) at a time when the braking torque of the front wheel 2 decreases and the suspension 22 contracts increases, and the damping force of the damping device 22d increases. As a result, when the ABS 80 operates to decrease the braking torque of the front wheel 2, the suspension 22 is less likely to contract. Thus, even if the ABS 80 operates and the cycle of increasing and decreasing the braking torque is repeated until the motorcycle having the control device 400 stops after the sudden brake operation is performed, a vibration hardly occurs. In addition, even if the vibration occurs, an amplitude becomes small. Further, a period of the cycle, in which the brake pressure is increased again after the brake pressure is reduced and thereafter the brake pressure is reduced again, is shortened.

As described above, according to the control device 400, even when the sudden brake operation is performed, the amplitude of the vibration can be reduced, and the period of the vibration can be further shortened. As a result, the behavior of the motorcycle including the control device 400 is stabilized, and the driver hardly feels rocking. Therefore, by including the control device 400, it is possible to provide the motorcycle capable of stabilizing the behavior when a sudden brake operation is performed and improving the steering feeling.

In the second embodiment described above, the correction unit 422 may set the correction current Icr in consideration of the vehicle speed which is the moving speed of the motorcycle 1. For example, when the vehicle speed is less than 5 (km/h), for example, the correction unit 422 may set the correction current Icr to 0, and when the vehicle speed is equal to or greater than 5 (km/h), for example, the correction unit 422 may set the correction current Icr set as described above as a final correction current Icr.

Further, instead of outputting 0 as the correction current Icf, the correction unit 422 may not output the correction current Icf.

Third Embodiment

Figure 13:
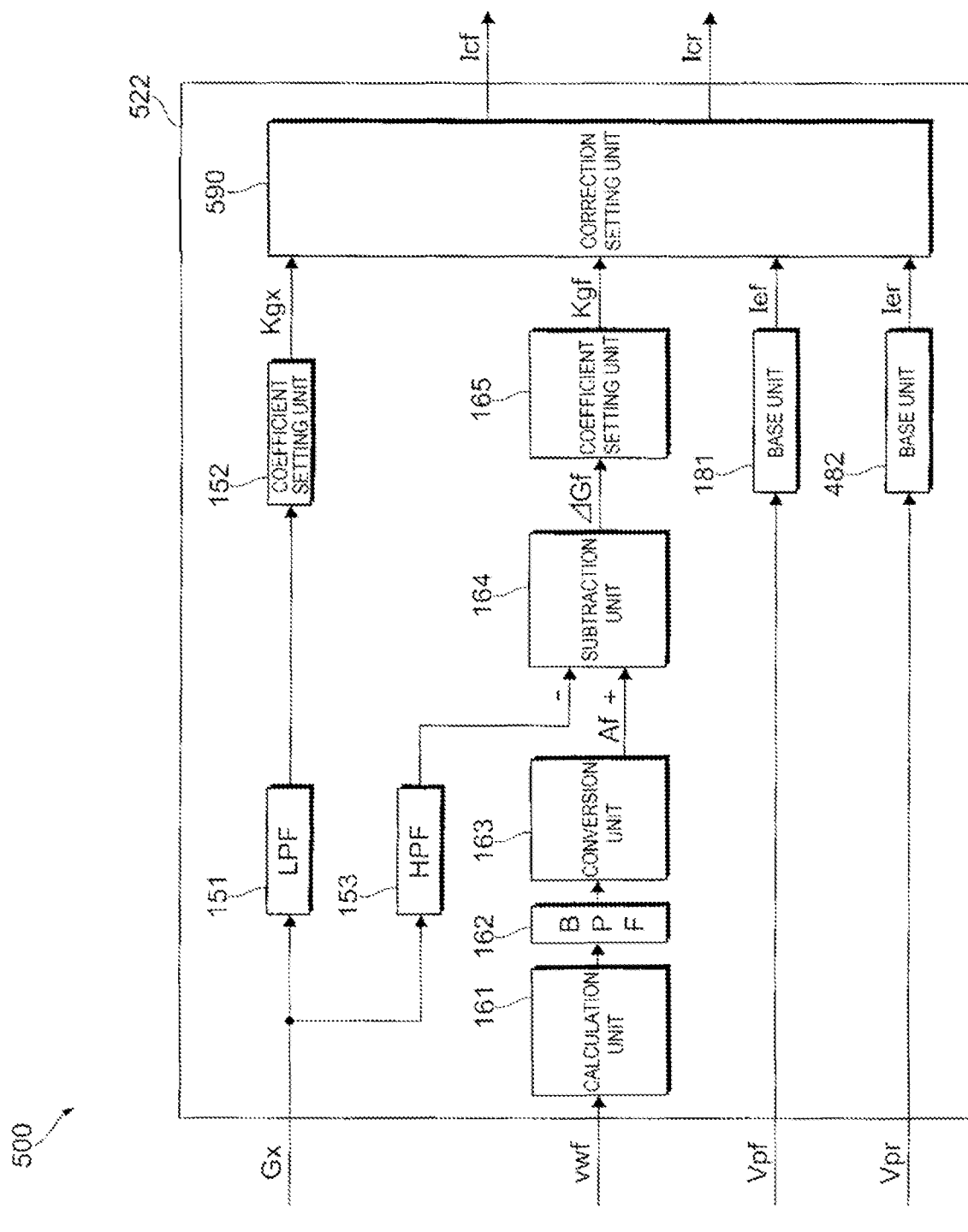
FIG. 13 is a diagram illustrating a schematic configuration of a correction unit 522 of a control device 500 according to a third embodiment.

FIG. 13 is a diagram illustrating a schematic configuration of a correction unit 522 of a control device 500 according to a third embodiment.

The control device 500 according to the third embodiment differs from the control device 100 according to the first embodiment in the correction unit 522 corresponding to the correction unit 122. Hereinafter, differences from the control device 100 will be described. Components having the same function are denoted by the same reference numerals in the control device 100 and the control device 500, and a detailed description thereof will be omitted.

The correction unit 522 includes a base unit 482 included in the correction unit 422 according to the second embodiment, in addition to the base unit 181 included in the correction unit 122.

The correction unit 522 includes a correction setting unit 590 which sets the correction current Icr in addition to setting the correction current Icf, instead of the correction setting unit 190. The correction setting unit 590 sets the correction current Icf using the same method as that of the correction setting unit 190. In addition, the correction setting unit 590 sets the correction current Icr by using the same method as the correction setting unit 490 according to the second embodiment.

According to the control device 500 according to the third embodiment, the effects of the control device 100 according to the first embodiment and the effects of the control device 400 according to the second embodiment can be achieved. That is, according to the control device 500, even when the sudden brake operation is performed, the amplitude of the vibration can be reduced, and the period of the vibration can be further shortened. As a result, the behavior of the motorcycle is stabilized, and the driver hardly feels rocking. Therefore, by including the control device 500, it is possible to provide the motorcycle capable of stabilizing the behavior when a sudden brake operation is performed and improving the steering feeling.

Fourth Embodiment

Figure 14:
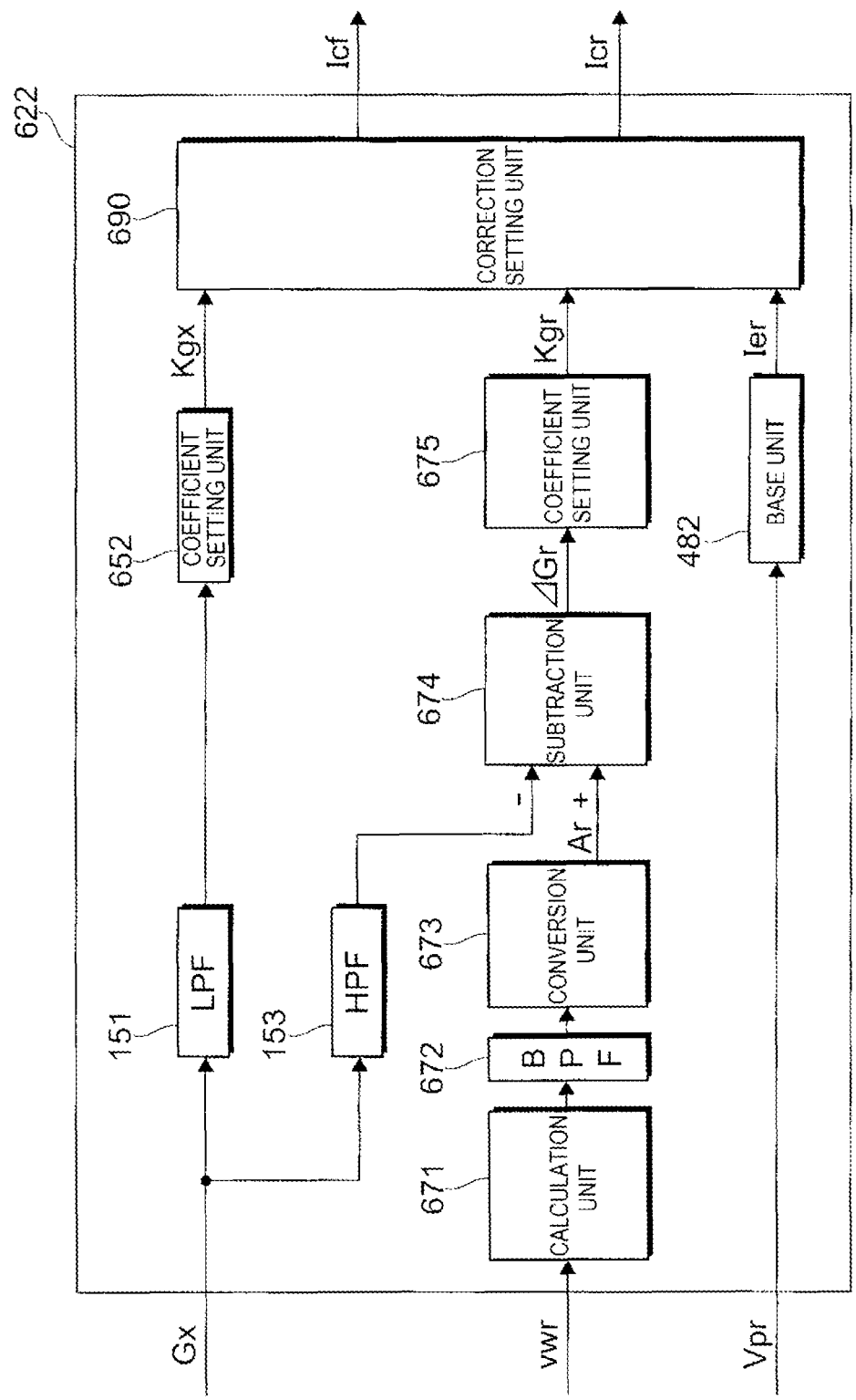
FIG. 14 is a diagram illustrating a schematic configuration of a correction unit 622 of a control device 600 according to a fourth embodiment.

FIG. 14 is a diagram illustrating a schematic configuration of a correction unit 622 of a control device 600 according to a fourth embodiment.

Figure 15:
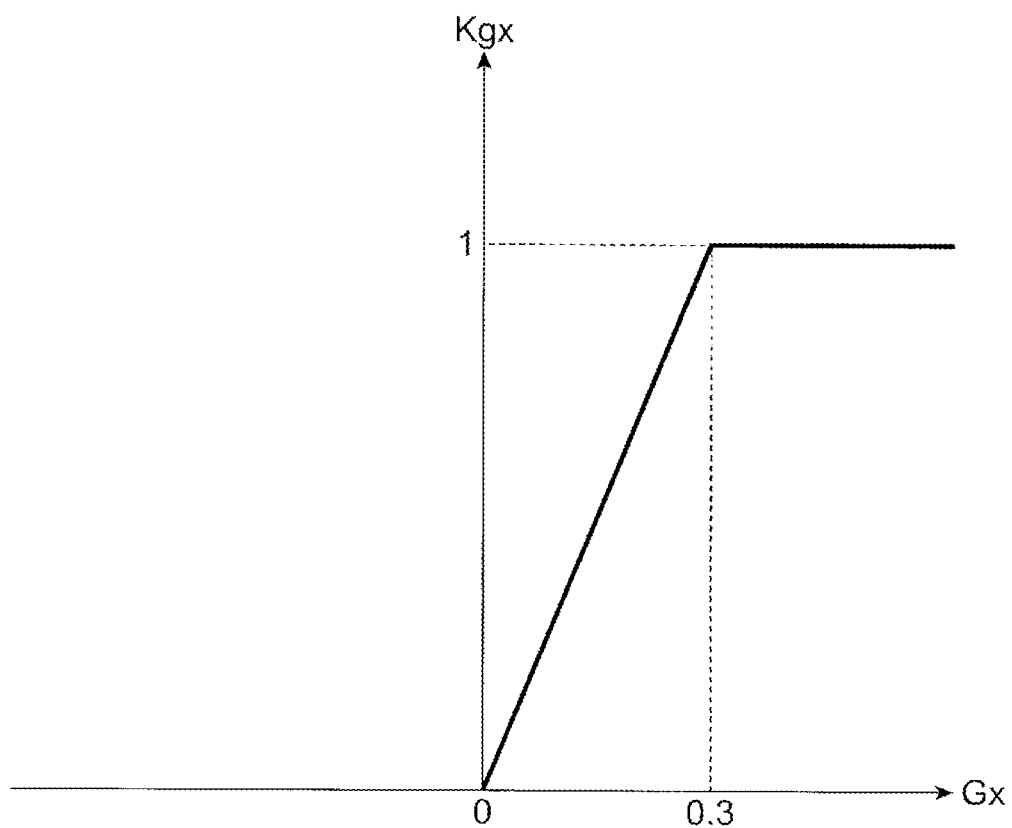
FIG. 15 is a schematic diagram of a control map illustrating an example of a relationship between the front-rear acceleration Gx and the correction coefficient Kgx.

FIG. 15 is a schematic diagram of a control map illustrating an example of a relationship between the front-rear acceleration Gx and the correction coefficient Kgx.

Figure 16:
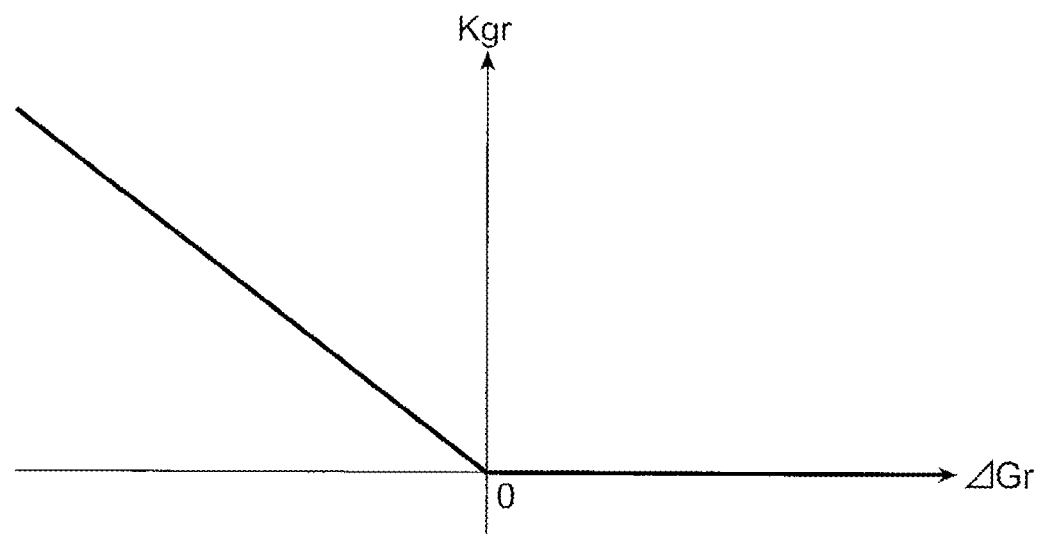
FIG. 16 is a schematic diagram of a control map illustrating an example of a relationship between an acceleration difference ΔGr and a correction coefficient Kgr.

FIG. 16 is a schematic diagram of a control map illustrating an example of a relationship between an acceleration difference ΔGr and a correction coefficient Kgr.

The control device 600 according to the fourth embodiment differs from the control device 100 according to the first embodiment in the correction unit 622 corresponding to the correction unit 122. Hereinafter, differences from the control device 100 will be described. Components having the same function are denoted by the same reference numerals in the control device 100 and the control device 600, and a detailed description thereof will be omitted.

The correction unit 622 includes a coefficient setting unit 652 which sets a correction coefficient Kgx corresponding to the front-rear acceleration Gx after the filtering processing, which is output from the LPF 151, instead of the coefficient setting unit 152.

For example, the coefficient setting unit 652 calculates the correction coefficient Kgx by substituting the front-rear acceleration Gx into the control map illustrating in FIG. 15 illustrating the relationship between the front-rear acceleration Gx and the correction coefficient Kgx, which is created in advance based on an empirical rule and recorded in the ROM. In the control map illustrated in FIG. 15, when the front-rear acceleration Gx is greater than 0 (g), the correction coefficient Kgx is positive, and when the front-rear acceleration Gx is equal to or less than 0 (g), the correction coefficient Kgx is 0. When the front-rear acceleration Gx is equal to or greater than −0.3 (g), the correction coefficient Kgx is 1, and the correction coefficient Kgx increases from 0 to 1 as the front-rear acceleration Gx increases from 0 (g) to −0.3 (g).

The correction unit 622 includes a calculation unit 671 which calculates a rotational acceleration of the rear wheel 3 and a BPF 672 which performs a filtering processing corresponding to the band-pass filter to the rotational acceleration calculated by the calculation unit 671, instead of the calculation unit 161 and the BPF 162 included in the correction unit 122. The correction unit 622 includes a conversion unit 673 which converts the unit of the rotational acceleration after the filtering processing, which is output from the BPF 672, into the gravitational acceleration (g), instead of the conversion unit 163 included in the correction unit 122. The calculation unit 671 calculates the rotational acceleration (km/h/s) of the rear wheel 3 using the rotational speed signal vwr from the vehicle wheel speed sensor 42 (by differentiating). The conversion unit 673 converts the unit of the rotational acceleration (km/h/s) of the rear wheel 3 after the filtering processing by the BPF 672, which is calculated by the calculation unit 671, into the gravitational acceleration (g), and outputs the converted value. Hereinafter, a value of the rotational acceleration of the rear wheel 3 after the conversion, in which the unit is converted into the gravitational acceleration (g) by the conversion unit 673, may be referred to as a rear wheel acceleration Ar (g).

The correction unit 622 includes a subtraction unit 674 which subtracts the front-rear acceleration Gx after the filtering processing output from the HPF 153 from the rear wheel acceleration Ar output from the conversion unit 673, instead of the subtraction unit 164 included in the correction unit 122. The correction unit 622 includes a coefficient setting unit 675 which sets a correction coefficient Kgr corresponding to an acceleration difference ΔGr (=Ar−Gx) after subtraction by the subtraction unit 674, instead of the coefficient setting unit 165 included in the correction unit 122.

For example, the coefficient setting unit 675 calculates the correction coefficient Kgr by substituting the acceleration difference ΔGr into the control map illustrated in FIG. 16 illustrating the relationship between the acceleration difference ΔGr and the correction coefficient Kgr, which is created in advance based on an empirical rule and recorded in the ROM. In the control map illustrated in FIG. 16, the correction coefficient Kgr is 0 when the acceleration difference ΔGf is equal to or greater than 0 (g), and is a positive value inversely proportional to the acceleration difference ΔGf when the acceleration difference ΔGr is smaller than 0 (g).

The correction unit 622 includes the base unit 482 included in the correction unit 422 according to the second embodiment, instead of the base unit 181 included in the correction unit 122.

The correction unit 622 includes a correction setting unit 690 which sets a value obtained by multiplying the correction coefficient Kgx set by the coefficient setting unit 652, the correction coefficient Kgr set by the coefficient setting unit 675, and the base current Ier set by the base unit 482 as the correction current Icr (=Kgx×Kgf×Ier), instead of the correction setting unit 190.

The calculation unit 671, the BPF 672, the conversion unit 673, the subtraction unit 674, the coefficient setting unit 675, the base unit 482, and the correction setting unit 690 described above repeatedly perform the above processing every predetermined period (for example, 1 millisecond).

The BPF 672 has the same function as that of the BPF 162, and has a function of cancelling an offset of the output value from the calculation unit 671, cancelling a noise, and matching the time constant. The BPF 672 may be configured by combining separate elements each having a function of performing a filtering processing corresponding to the high-pass filter and a function of performing a filtering processing corresponding to the low-pass filter. Note that, instead of the BPF 672, a filter which performs the filtering processing corresponding to the high-pass filter may be provided. In addition, instead of the BPF 672, a filter which performs the filtering processing corresponding to the low-pass filter may be provided.

The control device 600 configured as described above operates as follows.

In the following, a motorcycle which is not provided with the correction unit 622 of the control device 600, and is not applied with the correction currents Icf, Icr will be referred to as a second comparative vehicle with respect to the motorcycle having the control device 600.

In the second comparative vehicle, when a sudden acceleration operation is performed by suddenly turning the throttle grip 17, an engine torque rapidly increases, and the driving torque of the rear wheel 3 rapidly increases, so that the rotational speed of the rear wheel 3 rapidly increases more than the rotational speed of the front wheel 2. When the rear wheel 3 rotates idly, the driving torque of the rear wheel 3 is decreased by the TCS 90. When the rear wheel 3 starts to decelerate due to the decrease in the driving torque and the rear wheel 3 does not rotate idly, the TCS 90 does not operate and the driving torque increases again. The above cycle is repeated until the throttle grip 17 of the second comparative vehicle is returned.

When attention is paid to the suspension 22 on the rear wheel 3 side, the suspension 22 extends when the driving torque of the rear wheel 3 decreases, and then the driving torque is increased to accelerate the rear wheel 3, so that the suspension 22 contracts. Therefore, until the throttle grip 17 is returned again after the throttle grip 17 is suddenly turned, the cycle of decreasing and increasing the driving torque is repeated, so that the extension operation and the contraction operation of the suspension 22 are repeated, and a vibration is likely to occur.

When attention is paid to the rear wheel acceleration Ar, the throttle grip 17 is suddenly turned to increase the driving torque, so that the rear wheel acceleration Ar becomes positive. Thereafter, when the driving torque is decreased by the TCS 90, the rear wheel 3 is decelerated, so that the rear wheel acceleration Ar becomes negative. The front-rear acceleration Gx is positive until the second comparative vehicle reaches a constant speed after the sudden acceleration is performed.

In the motorcycle including the control device 600, when the rear wheel acceleration Ar is less than the front-rear acceleration Gx (when the acceleration difference ΔGr is smaller than 0), the coefficient setting unit 675 sets the correction coefficient Kgr to a value (positive value) greater than 0. When the acceleration operation is performed, the front-rear acceleration Gx is greater than 0 (positive value), so that the coefficient setting unit 652 sets the correction coefficient Kgx to a value greater than 0 (positive value). When the velocity Vpr is a value smaller than 0 and the velocity Vpr is a value greater than 0, the base unit 482 sets the base current Ier to a value (positive value) greater than 0.

Therefore, when the rear wheel acceleration Ar is less than the front-rear acceleration Gx, the correction setting unit 690 sets a positive correction current Icr. As a result, the TCS 90 operates, the target current Itr (=Ibr+Icr) at a time when the driving torque of the rear wheel 3 decreases and the suspension 22 extends increases, and the damping force of the damping device 22d increases. As a result, when the TCS 90 operates to decrease the driving torque of the rear wheel 3, the suspension 22 is less likely to extend. Thus, even if the TCS 90 operates and the cycle of increasing and decreasing the driving torque is repeated until the throttle grip 17 is returned after the sudden acceleration operation is performed, a vibration hardly occurs. In addition, even if the vibration occurs, an amplitude becomes small. That is, according to the control device 600, even when the sudden acceleration operation is performed, the behavior of the motorcycle including the control device 600 is stabilized. Therefore, a steering feeling is improved.

In a case where the sudden acceleration operation is performed, when the suspension 22 becomes difficult to extend due to the decrease in the driving torque of the rear wheel 3 by the operation of the TCS 90, the TCS 90 does not subsequently operate and a spring force when the driving torque of the rear wheel 3 is increased increases. As a result, a ground contact load of the rear wheel 3 with the road surface increases at an early stage. When the TCS 90 does not operate, the driving torque increases, and the rear wheel 3 rotates idly again, the driving torque of the rear wheel 3 is decreased by the TCS 90. As a result, a period of the cycle in which the TCS 90 operates again after the TCS 90 does not operate, and then the TCS 90 does not operate is shortened, so that a period in which the suspension 22 is switched to an operation in the extension direction, an operation in the compression direction, and an operation in the extension direction is shortened. In addition, since the cycle is shortened, the speed of the motorcycle including the control device 600 at an early stage increases.

As described above, according to the control device 600, even when the sudden acceleration operation is performed, the amplitude of the vibration can be reduced, and the period of the vibration can be further shortened. As a result, the behavior of the motorcycle having the control device 600 is stabilized, and the driver hardly feels rocking. Therefore, by including the control device 600, it is possible to provide the motorcycle capable of stabilizing the behavior when a sudden brake operation is performed and improving the steering feeling.

As described above, the control device 600 controls the damping force of the damping device 22d which dampens the force generated between the vehicle main body 10 and the rear wheel 3 as an example of the vehicle wheel using the front-rear acceleration Gx of the vehicle main body 10 and the rear wheel acceleration Ar as an example of the rotational acceleration of the rear wheel 3.

As exemplified in the case where the sudden acceleration operation is performed, the front-rear acceleration Gx and the rear wheel acceleration Ar become indications for grasping the behavior of the motorcycle including the control device 600. Therefore, by controlling the damping force of the damping device 22d using these values, the behavior of the vehicle can be stabilized.

For example, when the front-rear acceleration Gx is greater than 0 (g), that is, when the vehicle main body 10 is accelerating, a situation in which the rear wheel acceleration Ar is smaller than the front-rear acceleration Gx is a situation which does not occur when the acceleration operation is not performed. In such a situation, it is possible to suppress instability of the operation of the suspension 22 by increasing the damping force of the damping device 22d. When the rear wheel 3 is decelerating when the vehicle main body 10 is accelerating, since it is considered that the suspension 22 is operating in the extension direction even though the vehicle main body 10 is accelerating, it is possible to suppress the instability of the operation of the suspension 22 by increasing the damping force in the compression direction of the damping device 22d.

The control device 600 can also be regarded as a device which determines whether the TCS 90, which controls so as to suppress the idle rotation of the rear wheel 3, is operating. When the control device 600 determines that the TCS 90 is operating, the control device 600 increases the damping force as compared with the case where the TCS 90 is not determined to be operating. When the front-rear acceleration Gx is greater than 0 (g), that is, when the vehicle main body 10 is accelerating, in a case where the rear wheel acceleration Ar is less than the front-rear acceleration Gx, the control device 600 determines that the TCS 90 is operating so as to suppress the idle rotation of the rear wheel 3.

As a result of intensive studies by the present inventors, it has been found that when the idle rotation of the rear wheel 3 is suppressed by the TCS 90, for example, when the front-rear acceleration Gx is equal to or greater than 0.3 (g), a specific situation in which the rear wheel acceleration Ar is equal to or less than −0.1 (g) can occur. Therefore, for example, when the front-rear acceleration Gx is equal to or greater than 0.3 (g) and the rear wheel acceleration Ar is less than the front-rear acceleration Gx, the damping force in the extension direction of the damping device 22d is increased, so that the vibration caused by the suppression of the idle rotation of the rear wheel 3 by the TCS 90 during the sudden acceleration operation can be suppressed with high accuracy.

In the fourth embodiment described above, the correction unit 622 may set the correction current Icr in consideration of the vehicle speed which is the moving speed of the motorcycle including the control device 600. For example, when the vehicle speed is less than 5 km/h, for example, the correction unit 622 may set the correction current Icr to 0, and when the vehicle speed is equal to or greater than 5 (km/h), for example, the correction unit 622 may set the correction current Icr set as described above as the final correction current Icr.

In addition, the correction unit 622 may not output the correction current Icf instead of outputting 0 as the correction current Icf.

In addition to the correction unit 622, the control device 600 according to the fourth embodiment may include any one of the correction unit 122 included in the control device 100 according to the first embodiment, the correction unit 422 included in the control device 400 according to the second embodiment, and the correction unit 522 included in the control device 500 according to the third embodiment. Further, the target setting unit 123 may set the target currents Itf, Itr using the correction currents Icf, Icr set by the correction unit 622 and the correction currents Icf, Icr set by one correction unit (for example, the correction unit 122). For example, the target setting unit 123 may set a value obtained by adding the reference currents Ibf, Ibr set by the reference unit 121, the correction currents Icf, Icr set by the correction unit 622, and the correction currents Icf, Icr set by one correction unit (for example, the correction unit 122) to the target currents Itf, Itr.

Fifth Embodiment

Figure 17:
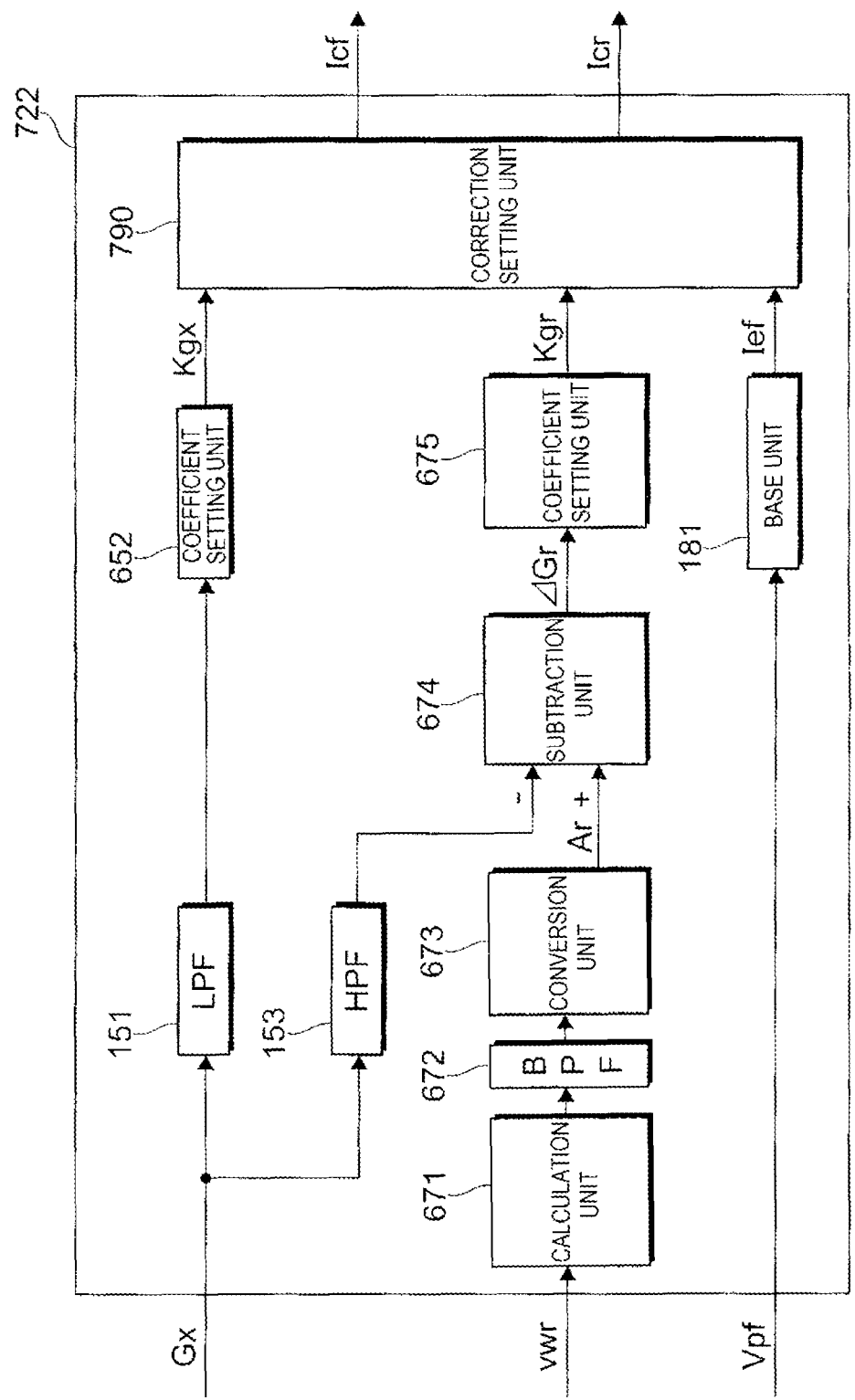
FIG. 17 is a diagram illustrating a schematic configuration of a correction unit 722 of a control device 700 according to a fifth embodiment.

FIG. 17 is a diagram illustrating a schematic configuration of a correction unit 722 of a control device 700 according to a fifth embodiment.

The control device 700 according to the fifth embodiment differs from the control device 600 according to the fourth embodiment in the correction unit 722 corresponding to the correction unit 622. Hereinafter, differences from the control device 600 will be described. Components having the same function are denoted by the same reference numerals in the control device 600 and the control device 700, and a detailed description thereof will be omitted.

The correction unit 722 includes the base unit 181 included in the correction unit 122 according to the first embodiment, instead of the base unit 482 included in the correction unit 622.

The correction unit 722 includes a correction setting unit 790 which sets a value obtained by multiplying the correction coefficient Kgx set by the coefficient setting unit 652, the correction coefficient Kgr set by the coefficient setting unit 675, and the base current Ief set by the base unit 181 as the correction current Icf, instead of the correction setting unit 690. The correction setting unit 790 sets the correction current Icr to 0.

The correction setting unit 790 repeatedly perform the above processing every predetermined period (for example, 1 millisecond).

In the second comparative vehicle, in a case where the sudden acceleration operation is performed by suddenly turning the throttle grip 17, when attention is paid to the suspension 21 on the front wheel 2 side, the suspension 21 contracts when the driving torque of the rear wheel 3 is decreased, and then the suspension 21 extends by increasing the driving torque and accelerating the rear wheel 3. Therefore, after the sudden brake operation is performed, the cycle of decreasing and increasing the driving torque is repeated until the throttle grip 17 is returned, so that the extension operation and the contraction operation of the suspension 21 are repeated, and a vibration is likely to occur.

On the other hand, in the motorcycle including the control device 700, when the rear wheel acceleration Ar is less than the front-rear acceleration Gx (when the acceleration difference ΔGr is smaller than 0), the coefficient setting unit 675 sets the correction coefficient Kgr to a value (positive value) greater than 0. When the acceleration operation is performed, the front-rear acceleration Gx is greater than 0 (positive value), so that the coefficient setting unit 652 sets the correction coefficient Kgx to a value greater than 0 (positive value). When the velocity Vpf is a value smaller than 0 and the velocity Vpf is a value greater than 0, the base unit 181 sets the base current Ief to a value (positive value) greater than 0.

Therefore, when the rear wheel acceleration Ar is less than the front-rear acceleration Gx, the correction setting unit 790 sets a positive correction current Icf. As a result, the TCS 90 operates, the target current Itf (=Ibf+Icf) at a time when the driving torque of the rear wheel 3 decreases and the suspension 21 contracts increases, and the damping force of the damping device 21d increases. As a result, when the TCS 90 operates to decrease the driving torque of the rear wheel 3, the suspension 21 is less likely to contract. Thus, even if the TCS 90 operates and the cycle of increasing and decreasing the driving torque is repeated until the throttle grip 17 is returned after the sudden acceleration operation is performed, a vibration hardly occurs. In addition, even if the vibration occurs, an amplitude becomes small. Further, a period of the cycle in which the TCS 90 operates again after the TCS 90 does not operate and thereafter the TCS 90 does not operate again is shortened.

As described above, according to the control device 700, even when the sudden acceleration operation is performed, the amplitude of the vibration can be reduced, and the period of the vibration can be further shortened. As a result, the behavior of the motorcycle is stabilized, and the driver hardly feels rocking. Therefore, by including the control device 700, it is possible to provide the motorcycle capable of stabilizing the behavior when a sudden brake operation is performed and improving the steering feeling.

In the fifth embodiment described above, the correction unit 722 may set the correction current Icf in consideration of the vehicle speed which is the moving speed of the motorcycle including the control device 700. For example, when the vehicle speed is less than 5 km/h, for example, the correction unit 722 may set the correction current Icf to 0, and when the vehicle speed is equal to or greater than 5 (km/h), for example, the correction unit 722 may set the correction current Icf set as described above as the final correction current Icf.

In addition, instead of outputting 0 as the correction current Icr, the correction unit 722 may not output the correction current Icr.

In addition to the correction unit 722, the control device 700 according to the fifth embodiment may include any one of the correction unit 122 included in the control device 100 according to the first embodiment, the correction unit 422 included in the control device 400 according to the second embodiment, and the correction unit 522 included in the control device 500 according to the third embodiment. Further, the target setting unit 123 may set the target currents Itf, Itr using the correction currents Icf, Icr set by the correction unit 722 and the correction currents Icf, Icr set by one correction unit (for example, the correction unit 122). For example, the target setting unit 123 may set a value obtained by adding the reference currents Ibf, Ibr set by the reference unit 121, the correction currents Icf, Icr set by the correction unit 722, and the correction currents Icf, Icr set by one correction unit (for example, the correction unit 122) to the target currents Itf, Itr.

Sixth Embodiment

Figure 18:
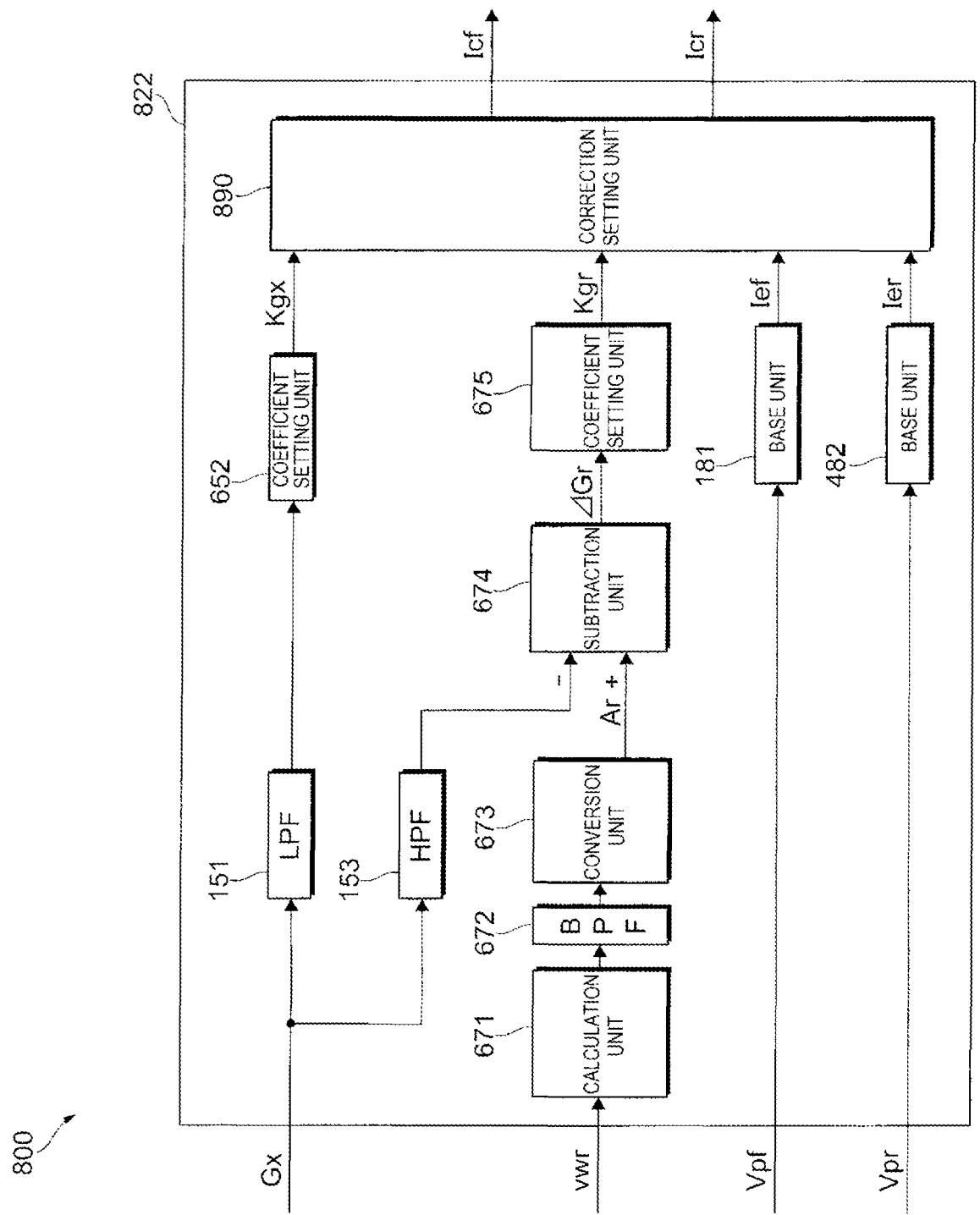
FIG. 18 is a diagram illustrating a schematic configuration of a correction unit 822 of a control device 800 according to a sixth embodiment.

FIG. 18 is a diagram illustrating a schematic configuration of a correction unit 822 of a control device 800 according to a sixth embodiment.

The control device 800 according to the sixth embodiment differs from the control device 600 according to the fourth embodiment in the correction unit 822 corresponding to the correction unit 622. Hereinafter, differences from the control device 600 will be described. Components having the same function are denoted by the same reference numerals in the control device 600 and the control device 800, and a detailed description thereof will be omitted.

The correction unit 822 includes the base unit 182 included in the correction unit 122 according to the first embodiment in addition to the base unit 482 included in the correction unit 622.

In addition, the correction unit 822 includes a correction setting unit 890 which sets the correction current Icf in addition to setting the correction current Icr, instead of the correction setting unit 690. The correction setting unit 890 sets the correction current Icr using the same method as that of the correction setting unit 690. In addition, the correction setting unit 890 sets the correction current Icf using the same method as the correction setting unit 790 according to the fifth embodiment.

According to the control device 800 according to the sixth embodiment, the effects of the control device 600 according to the fourth embodiment and the effects of the control device 700 according to the fifth embodiment can be achieved. That is, according to the control device 800, even when the sudden acceleration operation is performed, the amplitude of the vibration can be reduced, and the period of the vibration can be further shortened. As a result, the behavior of the motorcycle is stabilized, and the driver hardly feels rocking. Therefore, by including the control device 800, it is possible to provide the motorcycle capable of stabilizing the behavior when a sudden brake operation is performed and improving the steering feeling.

In addition to the correction unit 822, the control device 800 according to the sixth embodiment may include any one of the correction unit 122 included in the control device 100 according to the first embodiment, the correction unit 422 included in the control device 400 according to the second embodiment, and the correction unit 522 included in the control device 500 according to the third embodiment. Further, the target setting unit 123 may set the target currents Itf, Itr using the correction currents Icf, Icr set by the correction unit 822 and the correction currents Icf, Icr set by one correction unit (for example, the correction unit 122). For example, the target setting unit 123 may set a value obtained by adding the reference currents Ibf, Ibr set by the reference unit 121, the correction currents Icf, Icr set by the correction unit 822, and the correction currents Icf, Icr set by one correction unit (for example, the correction unit 122) to the target currents Itf, Itr.

The constituent elements of the control devices (for example, the control device 100) in the embodiments described above may be realized by hardware, or may be realized by software. In addition, in a case where some or all of the constituent elements of the present invention are realized by software, the software (computer program) can be provided in a form stored in a computer-readable recording medium. The "computer-readable recording medium" is not limited to a portable recording medium such as a flexible disk or a CD-ROM, and includes an internal storage device in a computer such as various RAMs and ROMs, and an external storage device such as a hard disk.

The invention claimed is:

1. A control device configured to control to increase a damping force of a first damping device in an extension direction, in which a relative displacement between a vehicle main body and a front wheel increases, or control to increase a damping force of a second damping device in a compression direction, in which a relative displacement between the vehicle main body and a rear wheel decreases, when an antilock brake system operates to control a slip state of the front wheel of a motorcycle, a braking torque generated in the front wheel becomes reduced, and a rotational acceleration of the front wheel becomes larger than a front-rear acceleration of the vehicle main body, the first damping device being configured to dampen a force generated between the vehicle main body and the front wheel, the second damping device being configured to dampen a force generated between the vehicle main body and the rear wheel.

2. The control device according to claim 1,
wherein the control device is configured to control to increase the damping force of the first damping device in the extension direction when the front-rear acceleration is equal to or less than −0.3 (g) and the rotational acceleration is greater than the front-rear acceleration.

3. A control device configured to control to increase a damping force of a damping device in an extension direction, in which a relative displacement between a vehicle main body and a rear wheel increases, when a traction control system operates to suppress an idle rotation of the rear wheel of a motorcycle, a braking torque generated in the rear wheel becomes reduced, and a rotational acceleration of the rear wheel becomes less than a front-rear acceleration of the vehicle main body, the damping device being configured to dampen a force generated between the vehicle main body and the rear wheel.

4. The control device according to claim 3,
wherein the control device is configured to control to increase the damping force of the damping device in the extension direction, when the front-rear acceleration is equal to or greater than 0.3 (g) and the rotational acceleration is less than the front-rear acceleration.

5. A control device configured to control to increase a damping force of a damping device in a compression direction, in which a relative displacement between a vehicle main body and a front wheel decreases, when a traction control system operates to suppress an idle rotation of a rear wheel of a motorcycle, a braking torque generated in the rear wheel becomes reduced, and a rotational acceleration of the rear wheel becomes less than a front-rear acceleration of a vehicle main body, the damping device being configured to dampen a force generated between the vehicle main body and the front wheel.

6. A suspension system comprising:
the control device according to claim 1; and
a suspension whose damping force is controlled by the control device.

7. A suspension system comprising:
the control device according to claim 2; and
a suspension whose damping force is controlled by the control device.

8. A suspension system comprising:
the control device according to claim 3; and
a suspension whose damping force is controlled by the control device.

9. A suspension system comprising:
the control device according to claim 4; and
a suspension whose damping force is controlled by the control device.

10. A suspension system comprising:
the control device according to claim 5; and
a suspension whose damping force is controlled by the control device.

* * * * *